US012098858B2

(12) United States Patent
Higashiyama et al.

(10) Patent No.: US 12,098,858 B2
(45) Date of Patent: Sep. 24, 2024

(54) DEVICE NETWORK SYSTEM RECOGNIZING DEVICES CONNECTED TO AN IDENTICAL NETWORK SYSTEM

(71) Applicant: DAIKIN INDUSTRIES, LTD., Osaka (JP)

(72) Inventors: Shin Higashiyama, Osaka (JP); Hiroshi Dohmae, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 403 days.

(21) Appl. No.: 17/599,146

(22) PCT Filed: Mar. 25, 2020

(86) PCT No.: PCT/JP2020/013414
§ 371 (c)(1),
(2) Date: Sep. 28, 2021

(87) PCT Pub. No.: WO2020/203575
PCT Pub. Date: Oct. 8, 2020

(65) Prior Publication Data
US 2022/0170657 A1 Jun. 2, 2022

(30) Foreign Application Priority Data

Mar. 29, 2019 (JP) .................................. 2019-067792
Mar. 29, 2019 (JP) .................................. 2019-067794

(51) Int. Cl.
*F24F 11/56* (2018.01)
*F24F 1/0007* (2019.01)
(Continued)

(52) U.S. Cl.
CPC ............ *F24F 11/56* (2018.01); *F24F 1/0007* (2013.01); *F24F 1/20* (2013.01); *F24F 11/873* (2018.01)

(58) Field of Classification Search
CPC .. F24F 11/56; F24F 1/0007; F24F 1/20; F24F 11/873; F24F 11/30; H04L 2012/285; H04L 12/2809; H04L 12/12; Y02D 30/50
See application file for complete search history.

(56) References Cited

U.S. PATENT DOCUMENTS 8,861,232 B2 * 10/2014 Ikeda ................. G01R 19/0092
363/55
8,936,039 B2 * 1/2015 Kim ......................... F24F 11/30
137/551
(Continued)

FOREIGN PATENT DOCUMENTS

JP      2006-29642 A    2/2006
JP      2006-319863 A   11/2006
(Continued)

OTHER PUBLICATIONS

International Search Report (PCT/ISA/210) issued in PCT/JP2020/013414 mailed on Jun. 16, 2020.
(Continued)

*Primary Examiner* — Alicia M. Choi
(74) *Attorney, Agent, or Firm* — Birch, Stewart, Kolasch & Birch, LLP

(57) ABSTRACT

System recognition is performed on devices connected to an identical system without recognizing a device of a different system as a device of the identical system in high-frequency communication. In a device network system, an outdoor unit selected from among all outdoor units of a first network performs a recognition process on the outdoor units and indoor units of the first network. In the first network, communication between individual devices including the outdoor units and the indoor units is performed by using a high frequency, and the recognition process performed by the selected outdoor unit uses a recognition signal having a low frequency.

20 Claims, 17 Drawing Sheets

(51) Int. Cl.
*F24F 1/20* (2011.01)
*F24F 11/873* (2018.01)

(56) References Cited

U.S. PATENT DOCUMENTS

| | | | | |
|---|---|---|---|---|
| 10,983,496 | B1* | 4/2021 | Aljohani | G05B 19/0428 |
| 2006/0190538 | A1* | 8/2006 | Hwang | H04L 67/51 |
| | | | | 709/204 |
| 2011/0219798 | A1* | 9/2011 | Kim | F24F 1/0003 |
| | | | | 62/129 |
| 2015/0000310 | A1* | 1/2015 | Lee | F25B 49/02 |
| | | | | 62/126 |
| 2016/0007288 | A1 | 1/2016 | Samardzija et al. | |
| 2018/0323998 | A1 | 11/2018 | Sawa | |
| 2022/0140901 | A1* | 5/2022 | Arulandu | H04B 10/11 |
| | | | | 398/118 |

FOREIGN PATENT DOCUMENTS

| | | | |
|---|---|---|---|
| JP | 2007-129661 | A | 5/2007 |
| JP | 2012093018 | A * | 5/2012 |
| JP | 2015-227734 | A | 12/2015 |
| JP | 2016219983 | A * | 12/2016 |
| JP | 2018-33033 | A | 3/2018 |
| JP | 2018-191116 | A | 11/2018 |

OTHER PUBLICATIONS

International Preliminary Report on Patentability and English translation of the Written Opinion of the International Searching Authority dated Oct. 14, 2021 for Application No. PCT/JP2020/013414.
Extended European Search Report for European Application No. 20781745.3, dated Apr. 8, 2022.

* cited by examiner

DEVICE NETWORK SYSTEM RECOGNIZING DEVICES CONNECTED TO AN IDENTICAL NETWORK SYSTEM

TECHNICAL FIELD

The present disclosure relates to a device network system that performs high-frequency communication.

BACKGROUND ART

In an existing multi-air conditioner for a building, an indoor unit/outdoor unit connection line and an inter-system connection line are separately connected, and at the time of recognizing an indoor unit/outdoor unit system, the inter-system connection line is disconnected by a relay to create a state in which only indoor units and outdoor units of an identical system are present in a network, for the purpose of identifying the indoor units and the outdoor units of the identical system.

SUMMARY OF INVENTION

Technical Problem

However, in a case of performing communication by changing a communication scheme to a scheme of using a higher-frequency signal to increase a communication speed, disconnection by a relay according to a conventional method may cause crosstalk in which signals mutually leak due to a parasitic capacitance between contacts of the relay or substrate patterns and may cause coupling of networks divided by the relay. Thus, the relay does not fulfill the function in high-frequency communication. When communication lines of different networks that are not connected by a physical line are parallel to each other and a parasitic capacitance or mutual induction between the communication lines causes mutual leakage of signals and crosstalk, the networks that are not physically connected may couple to each other. When such crosstalk occurs, a device of a different network that is not physically connected may be recognized as a device of an identical system in a process of performing system recognition of a network by communication as in the conventional method.

Accordingly, there is an issue of establishing means for appropriately performing system recognition on devices connected to an identical system without recognizing a device of a different system as a device of the identical system in high-frequency communication.

Solution to Problem

A device network system according to a first aspect includes a first network, a second network, and a first processing unit. The first network includes a first device group and a first line group, the first device group including a plurality of first devices, the first line group being connected to the plurality of first devices. The second network includes a second device group and a second line group, the second device group including a plurality of second devices, the second line group being connected to the plurality of second devices. The first processing unit performs a recognition process on the first device group of the first network. In the first network, communication between the first devices is performed by using a high frequency, and the recognition process performed by the first processing unit uses a recognition signal having a low frequency.

In this device network system, in system recognition of the first device group of the first network, recognition of a second device of the second network that is not physically connected is avoided.

A device network system according to a second aspect is the device network system according to the first aspect, in which the first processing unit transmits a first recognition signal which has a low frequency and which is for recognizing the plurality of first devices as devices of an identical group.

A device network system according to a third aspect is the device network system according to the second aspect, in which a first filter is disposed between the first network and the second network, passes a communication signal which has a high frequency and which is for communication between the first devices and the second devices, and blocks the first recognition signal.

In this device network system, the first filter prevents the first recognition signal for recognizing the plurality of first devices as devices of an identical group from being transmitted to the second network. As a result of the first recognition signal being blocked by the first filter, the first recognition signal enables the plurality of first devices of the first network to be recognized while being distinguished from the plurality of second devices of the second network. Between the first network and the second network, the plurality of first devices and the plurality of second devices are capable of communicating with each other by using communication signals.

A device network system according to a fourth aspect is the device network system according to the second aspect or the third aspect, in which the plurality of first devices include an intermediate device. The plurality of first devices are grouped into an upper group including the intermediate device and a lower group including the intermediate device, and are configured so that a first device of the upper group and a first device of the lower group are capable of communicating with each other via the intermediate device by using the communication signal. The device network system according to the second aspect includes a second filter that is disposed between the first device of the lower group and the intermediate device, that passes the communication signal having a high frequency, and that blocks the first recognition signal having a low frequency. The first processing unit recognizes the first device of the lower group via the intermediate device by using the first recognition signal.

In this device network system, the second filter prevents the first recognition signal for recognizing the first device of the upper group from being transmitted to the first device of the lower group. As a result of the first recognition signal being blocked by the second filter, the first device of the upper group can be determined while being distinguished from the first device of the lower group. Between the upper group and the lower group, a communication signal enables the plurality of first devices to communicate with each other.

A device network system according to a fifth aspect is the device network system according to the third aspect or the fourth aspect, in which the first filter includes a capacitor or a relay, the capacitor or the relay passing the communication signal having a high frequency and blocking the first recognition signal having a low frequency.

In this device network system, the first filter including the capacitor or the relay easily implements the device network system.

A device network system according to a sixth aspect is the device network system according to any one of the second aspect to the fifth aspect, in which the plurality of first devices belong to an identical first system in which identical refrigerant circulates. The first recognition signal is used in system recognition for recognizing that the plurality of first devices belong to the first system.

In this device network system, the first recognition signal used for system recognition of the first system makes it is possible to suppress recognition error in which the plurality of second devices of the second network are included in the first system.

A device network system according to a seventh aspect is the device network system according to any one of the first aspect to the sixth aspect, in which the plurality of first devices include a plurality of first indoor units that air-condition an inside of a room and a first outdoor unit that allows refrigerant to circulate between the first outdoor unit and the plurality of first indoor units. The plurality of second devices include a plurality of second indoor units that air-condition an inside of a room and a second outdoor unit that allows refrigerant to circulate between the second outdoor unit and the plurality of second indoor units. The first processing unit is provided in the first outdoor unit.

In this device network system, as a result of the first recognition signal being blocked by the first filter, the first outdoor unit including the first processing unit is capable of recognizing the plurality of first indoor units while distinguishing them from the plurality of second indoor units and the second outdoor unit by using the first recognition signal. Communication signals enable communication to be performed between the plurality of first indoor units and the first outdoor unit, and the plurality of second indoor units and the second outdoor unit.

A device network system according to an eighth aspect is the device network system according to any one of the first aspect to the seventh aspect, in which the device network system further includes a second processing unit. The second processing unit performs a recognition process on the second device group of the second network.

A device network system according to a ninth aspect is the device network system according to the eighth aspect, in which, in the second network, communication between the second devices is performed by using a high frequency, and the recognition process performed by the second processing unit uses a recognition signal having a low frequency.

A device network system according to a tenth aspect is the device network system according to the ninth aspect, in which the second processing unit transmits a second recognition signal which has a low frequency and which is for recognizing the plurality of second devices as devices of an identical group.

A device network system according to an eleventh aspect is the device network system according to the third aspect, in which the device network system further includes a second processing unit that transmits a second recognition signal which has a low frequency and which is for recognizing the plurality of second devices as devices of an identical group. The first filter blocks the second recognition signal.

In this device network system, as a result of the second recognition signal being blocked by the first filter, the plurality of second devices of the second network can be recognized while being distinguished from the plurality of first devices of the first network.

A device network system according to a twelfth aspect is the device network system according to any one of the first aspect to the eleventh aspect, in which the high frequency is a frequency of 100 kHz or more.

A device network system according to a thirteenth aspect is the device network system according to any one of the first aspect to the twelfth aspect, in which the low frequency is a frequency of 10 kHz or less.

DESCRIPTION OF EMBODIMENTS

First Embodiment (1) Overview of Device Network System

Figure 1A:
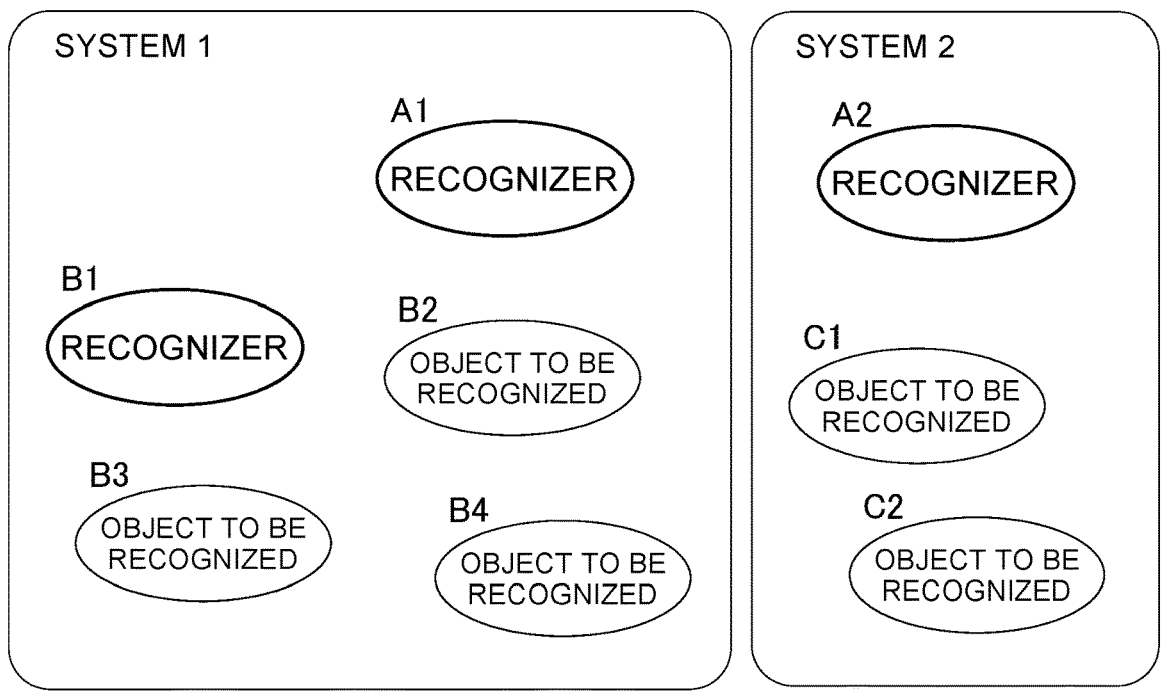
FIG. 1A is a conceptual diagram of system recognition.
Figure 1A:
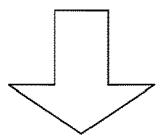
Figure 1A:
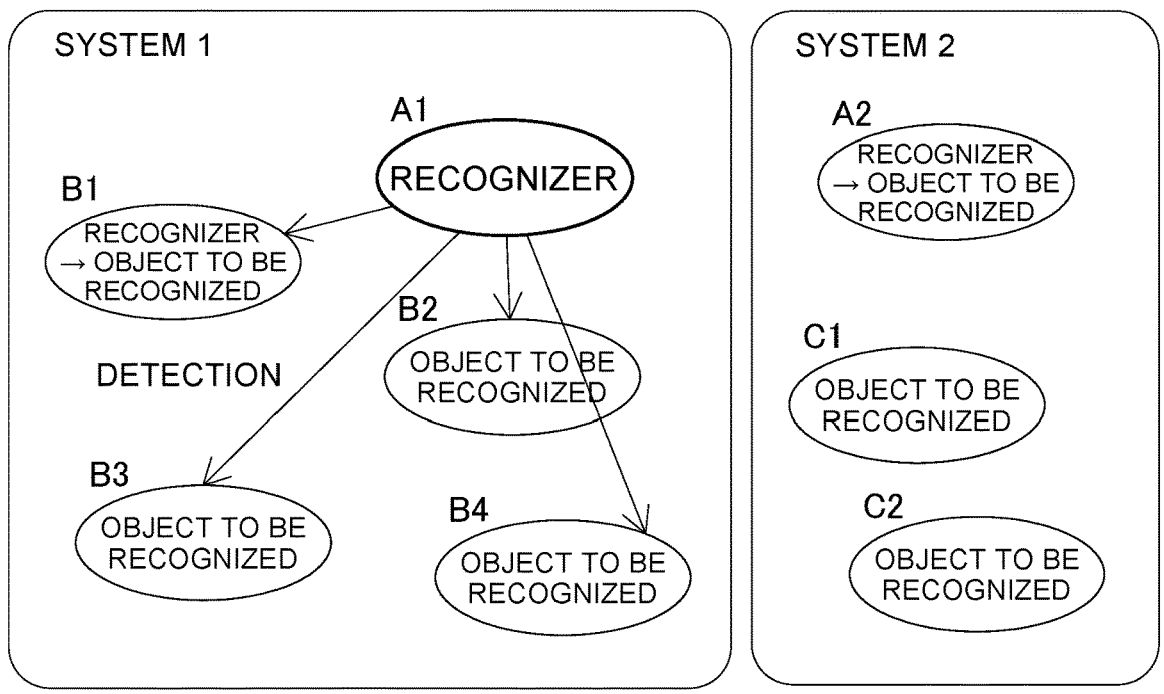

FIG. 1A is a conceptual diagram of system recognition. In FIG. 1A, there are devices A1, A2, B1, B2, B3, B4, C1, and C2, all of which belong to one communication network and are capable of communicating with each other. A system 1 is a system to which the devices A1, B1, B2, B3, and B4 belong. A system 2 is a system to which the devices A2, C1, and C2 belong. In an initial state, each device is unable to grasp the system to which the device belongs, and needs to identify the system to which the device belongs by system recognition. To implement system recognition, it is necessary to determine the role in the network of the device serving as a recognition target. The devices in the network include a device serving as a "recognizer" and a device serving as an "object to be recognized", which are initial roles. For example, the "recognizer" corresponds to an outdoor unit or a centralized controller, whereas the "object to be recognized" corresponds to an indoor unit.

(1-1) Procedure of System Recognition

Figure 1B:
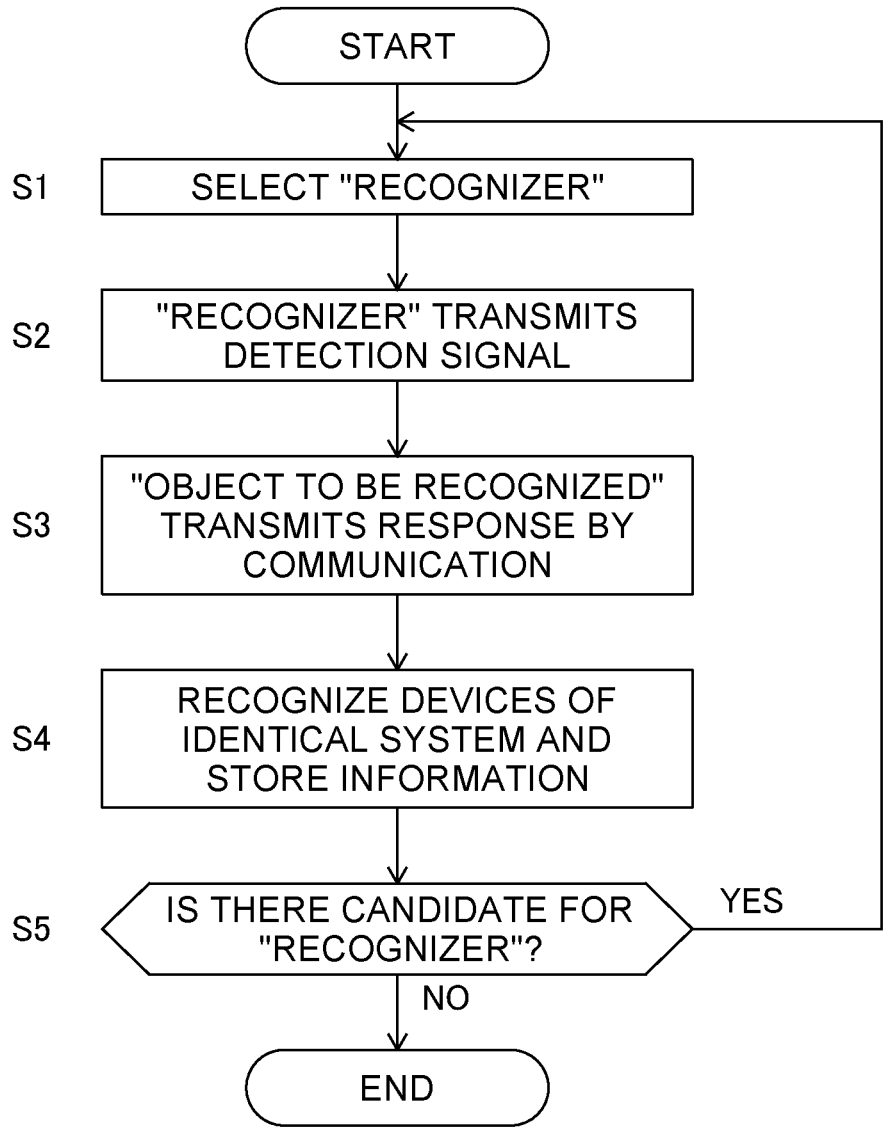
FIG. 1B is a flowchart of system recognition.

FIG. 1B is a flowchart of system recognition. Hereinafter, a procedure of system recognition will be described with reference to FIG. 1A and FIG. 1B. As illustrated in an upper part of FIG. 1A, the system 1 includes two devices A1 and B1 that can serve as a "recognizer", which is a recognizing side. On the other hand, the system 2 includes one device A2 that can serve as a "recognizer".

(Step S1)

One "recognizer" is selected from among the three devices A1, B1, and A2 by communication. A selection method may be, for example, a method of referring to unique IDs or communication addresses of the respective devices and determining the device having the smallest value to be a "recognizer".

If the device A1 is selected as a "recognizer", the devices B1 and A2 that are not selected as a "recognizer" temporarily become "objects to be recognized" (see a lower part of FIG. 1A).

(Step S2)

After the devices B1 and A2 have shifted to "objects to be recognized", the device A1 serving as a "recognizer" transmits a detection signal for system recognition to the devices B1, B2, B3, and B4 serving as "objects to be recognized".

At this time, the detection signal must not be transmitted to the devices A2, C1, and C2 of the system 2, which is a different system, but the detection signal is transmitted only to the devices B1, B2, B3, and B4 of the system 1, which is the identical system.

(Step S3)

The devices B1, B2, B3, and B4 serving as "objects to be recognized" that have received the detection signal each transmit a response by communication.

(Step S4)

The device A1 serving as a "recognizer" recognizes that the devices B1, B2, B3, and B4 serving as "objects to be recognized" from which responses have been received are devices belonging to the identical system, and stores information thereof.

(Step S5)

The device A1 that has already been selected as a "recognizer" and the device B1 that has shifted to an "object to be recognized" and has been recognized are excluded from candidates for the next "recognizer". The process from step S1 to step S4 is repeated until there is no candidate for the next "recognizer". As a result, the device composition of each system is grasped.

(1-2) Recognition of Multistage System Connection

Figure 2:
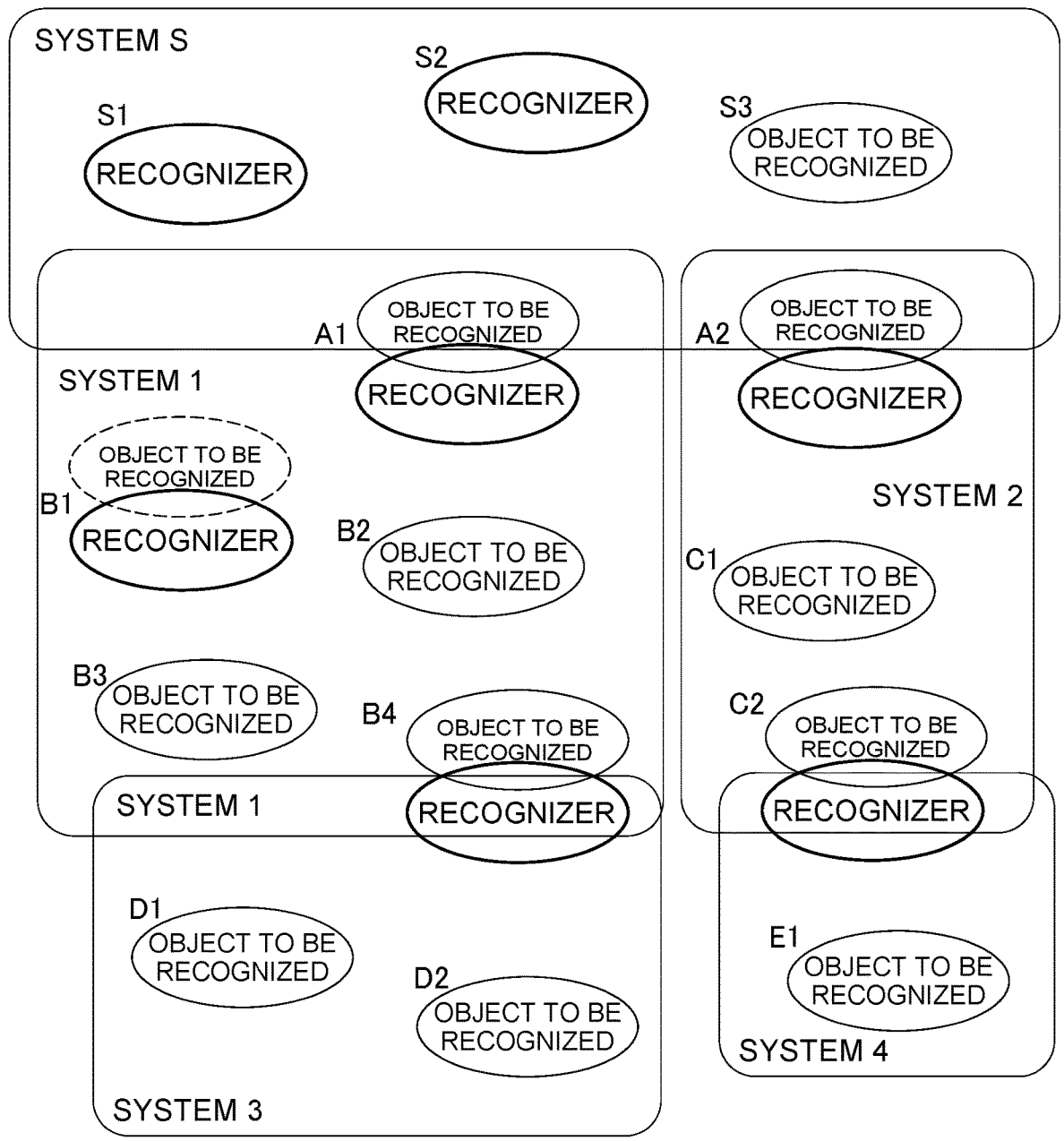
FIG. 2 is a conceptual diagram of system recognition in a case where systems are connected in a multistage manner.
Figure 3:
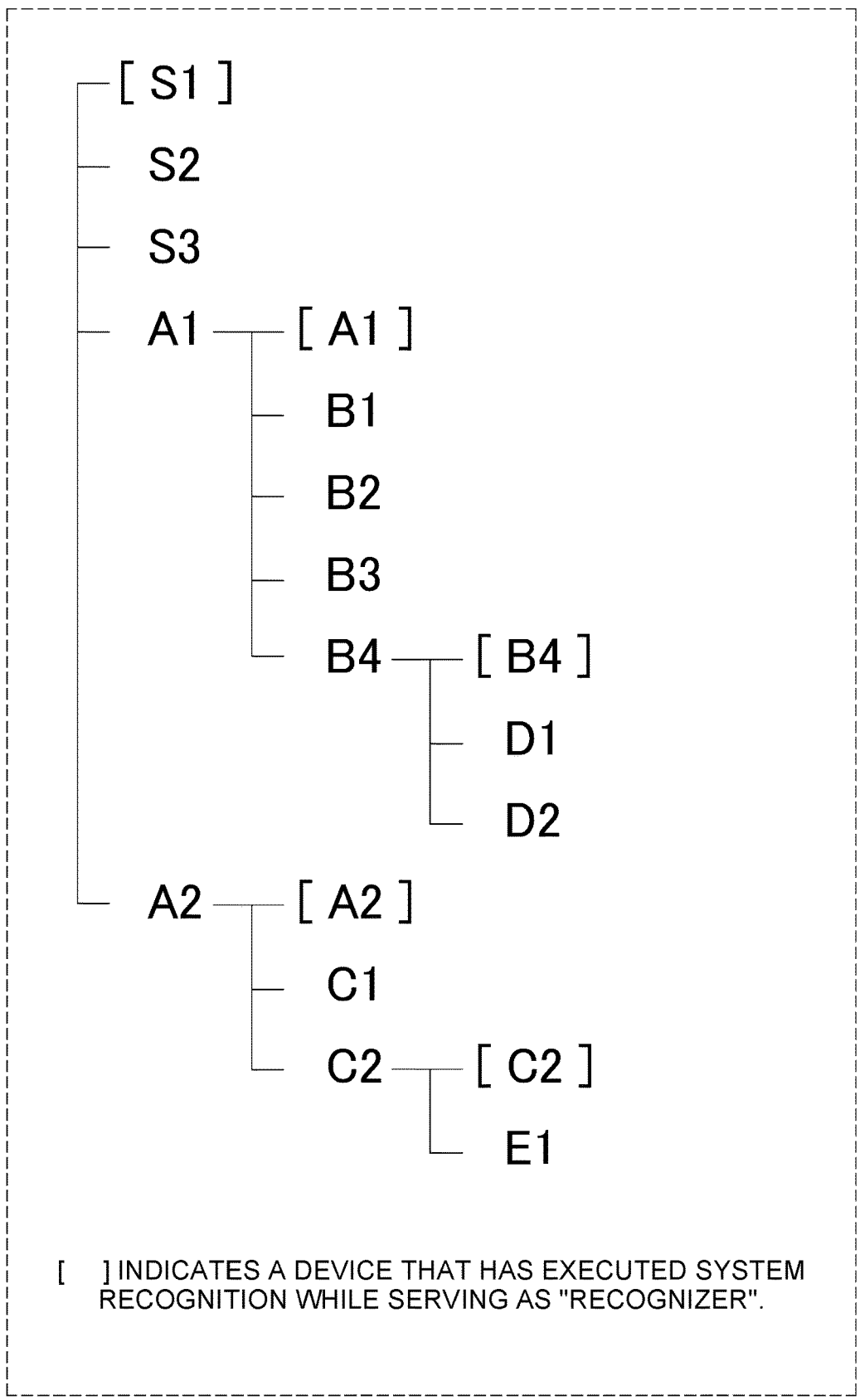
FIG. 3 is a system list created on the basis of the form in FIG. 2.

FIG. 2 is a conceptual diagram of system recognition in a case where systems are connected in a multistage manner. FIG. 3 is a system list created on the basis of the form in FIG. 2. In FIG. 2, there are two types of roles, a "recognizer" and an "object to be recognized". The systems are connected to each other by devices having, as a form of devices, both roles of a "recognizer" and an "object to be recognized", such as the devices A1, A2, B4, and C2. These devices each serve as an "object to be recognized" for an upstream side and serve as a "recognizer" for a downstream side. The system herein is not limited to a refrigerant system.

Specifically, the device A1 connects a system S and the system 1, and the device A2 connects the system S and the system 2. Also, the device B4 connects the system 1 and a system 3, and the device C2 connects the system 2 and a system 4.

Systems can be connected to each other at only one point on the upstream side. Coupling with a plurality of systems is possible on the downstream side.

(2) Application to Air Conditioning System

Figure 4:
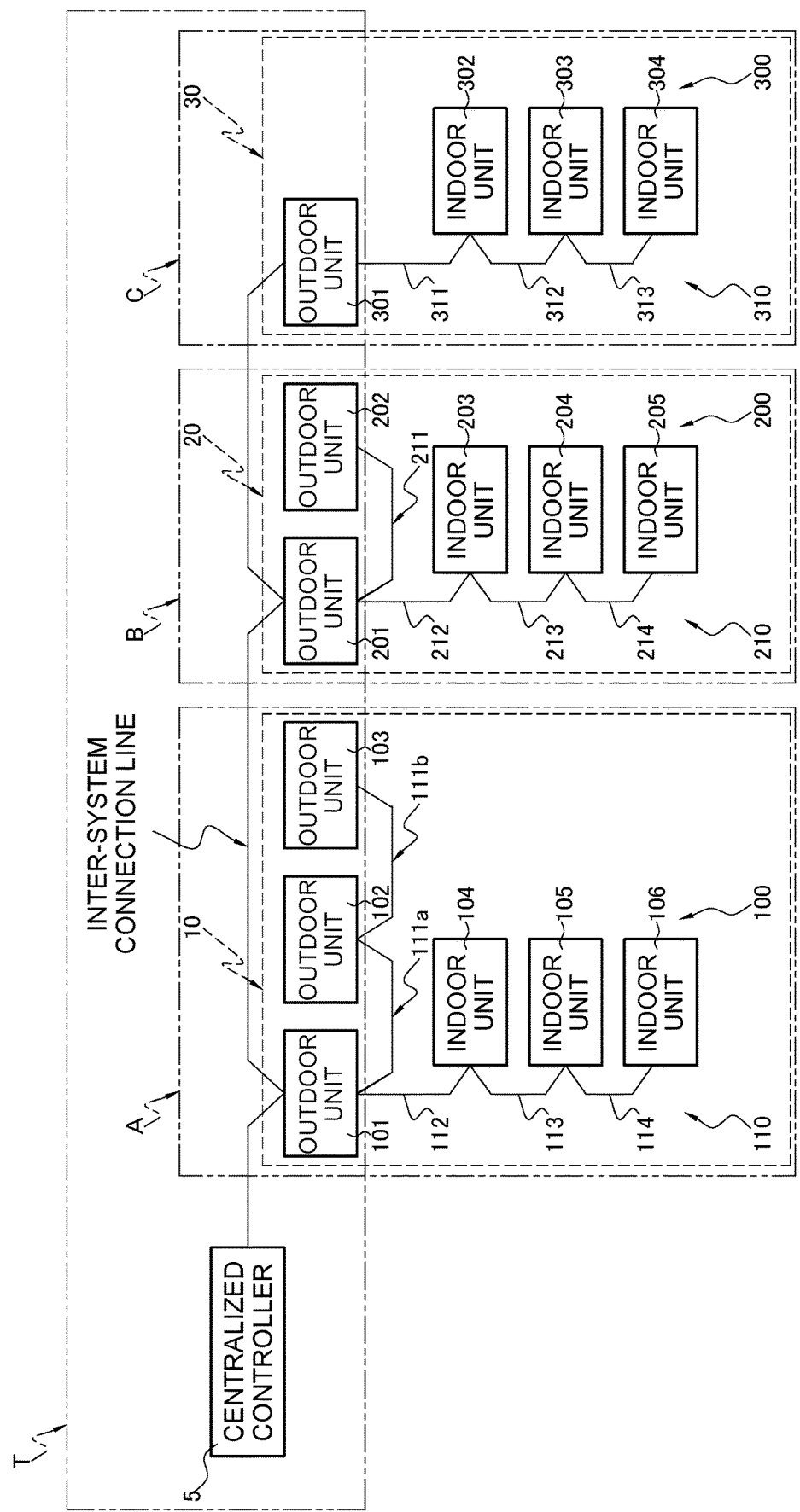
FIG. 4 is a configuration diagram of an air conditioning system including a plurality of refrigerant systems.

FIG. 4 is a configuration diagram of an air conditioning system including a plurality of refrigerant systems. In FIG. 4, the air conditioning system is constituted by outdoor units, indoor units, and a centralized controller. A system unit physically connected by refrigerant pipes is called a refrigerant system.

In a refrigerant system A, outdoor units 101, 102, and 103 and indoor units 104, 105, and 106 serving as devices are connected by lines 111a, 111b, 112, 113, and 114, and are connected by a line group 110.

In a refrigerant system B, outdoor units 201 and 202 and indoor units 203, 204, and 205 serving as devices are connected by lines 211, 212, 213, and 214, and are connected by a line group 210.

In a refrigerant system C, an outdoor unit 301 and indoor units 302, 303, and 304 serving as devices are connected by lines 311, 312, and 313, and are connected by a line group 310.

In a system T, the refrigerant systems A, B, and C are connected by an inter-system connection line and a centralized controller 5 is connected thereto, for the purpose of controlling the plurality of refrigerant systems A, B, and C.

All the devices form one communication network. Communication between the individual devices is performed using a high frequency of 100 kHz or more.

In system recognition, it is determined which of the systems A, B, C, and T the individual outdoor units and indoor units and the centralized controller belong to. Here, a description will be given of recognition of devices in the systems A, B, and C for simplifying the description. Note that recognition for the system T to which the centralized controller and the outdoor units belong is not different from a recognition process for the systems A to C.

One "recognizer" is selected from among all the outdoor units of the three refrigerant systems A, B, and C. For example, in FIG. 4, the refrigerant system A includes the three outdoor units 101, 102, and 103 that can be a "recognizer".

Also, the refrigerant system B includes the two outdoor units 201 and 202 that can be a "recognizer". Furthermore, the refrigerant system C includes the one outdoor unit 301 that can be a "recognizer".

One "recognizer" is selected from among the six outdoor units. System recognition may be started from any system. For the sake of convenience, a description will be given in order from the refrigerant system A.

(2-1) System Recognition in Refrigerant System A

For example, if the outdoor unit 101 is selected as a "recognizer", the outdoor units 102, 103, 201, 202, and 301 that are not selected as a "recognizer" temporarily become "objects to be recognized".

Subsequently, the outdoor unit 101 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the outdoor units 102 and 103 and the indoor units 104, 105, and 106 of the refrigerant system A, which is the identical system, and the detection signal must not be transmitted to the outdoor units 201, 202, and 301 and the indoor units 203, 204, 205, 302, 303, and 304 of the refrigerant systems B and C, which are different systems. Specifically, a high pass filter, for example, a capacitor, is inserted to the inter-system connection line side of the outdoor units, so as to achieve insulation in a low frequency manner and prevent the detection signal from being transmitted to the other systems.

Subsequently, the outdoor units 102 and 103 and the indoor units 104, 105, and 106 serving as "objects to be recognized" that have received the detection signal each transmit a response by communication.

The outdoor unit 101 serving as a "recognizer" recognizes that the outdoor units 102 and 103 and the indoor units 104, 105, and 106 serving as "objects to be recognized" from which responses have been received are devices belonging to the identical system, and stores information thereof.

(2-2) System Recognition in Refrigerant System B

The outdoor unit 101 of the refrigerant system A that has already been selected as a "recognizer" and the outdoor units 102 and 103 that have been recognized as belonging to the refrigerant system A are excluded from candidates for the next "recognizer", and thus one "recognizer" is selected from among the outdoor units 201, 202, and 301 of the two refrigerant systems B and C.

For example, if the outdoor unit 201 is selected as a "recognizer", the outdoor units 202 and 301 that are not selected as a "recognizer" temporarily become "objects to be recognized".

Subsequently, the outdoor unit 201 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the outdoor unit 202 and the indoor units 203, 204, and 205 of the refrigerant system B, which is the identical system, and the detection signal must not be transmitted to the outdoor units 101, 102, 103, and 301 and the indoor units 104, 105, 106, 302, 303, and 304 of the refrigerant systems A and C, which are different systems.

Subsequently, the outdoor unit 202 and the indoor units 203, 204, and 205 serving as "objects to be recognized" that have received the detection signal each transmit a response by communication.

The outdoor unit 201 serving as a "recognizer" recognizes that the outdoor unit 202 and the indoor units 203, 204, and 205 serving as "objects to be recognized" from which responses have been received are devices belonging to the identical system, and stores information thereof.

(2-3) System Recognition in Refrigerant System C

The outdoor unit 101 of the refrigerant system A and the outdoor unit 201 of the refrigerant system B that have already been selected as a "recognizer", the outdoor units 102 and 103 that have been recognized as belonging to the refrigerant system A, and the outdoor unit 202 that has been recognized as belonging to the refrigerant system B are excluded from candidates for the next "recognizer", and thus the outdoor unit 301 of the refrigerant system C serves as a "recognizer".

Subsequently, the outdoor unit 301 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the indoor units 302, 303, and 304 of the refrigerant system C, which is the identical system, and the detection signal must not be transmitted to the outdoor units 101, 102, 103, 201, and 202 and the indoor units 104, 105, 106, 203, 204, and 205 of the refrigerant systems A and B, which are different systems.

Figure 5:
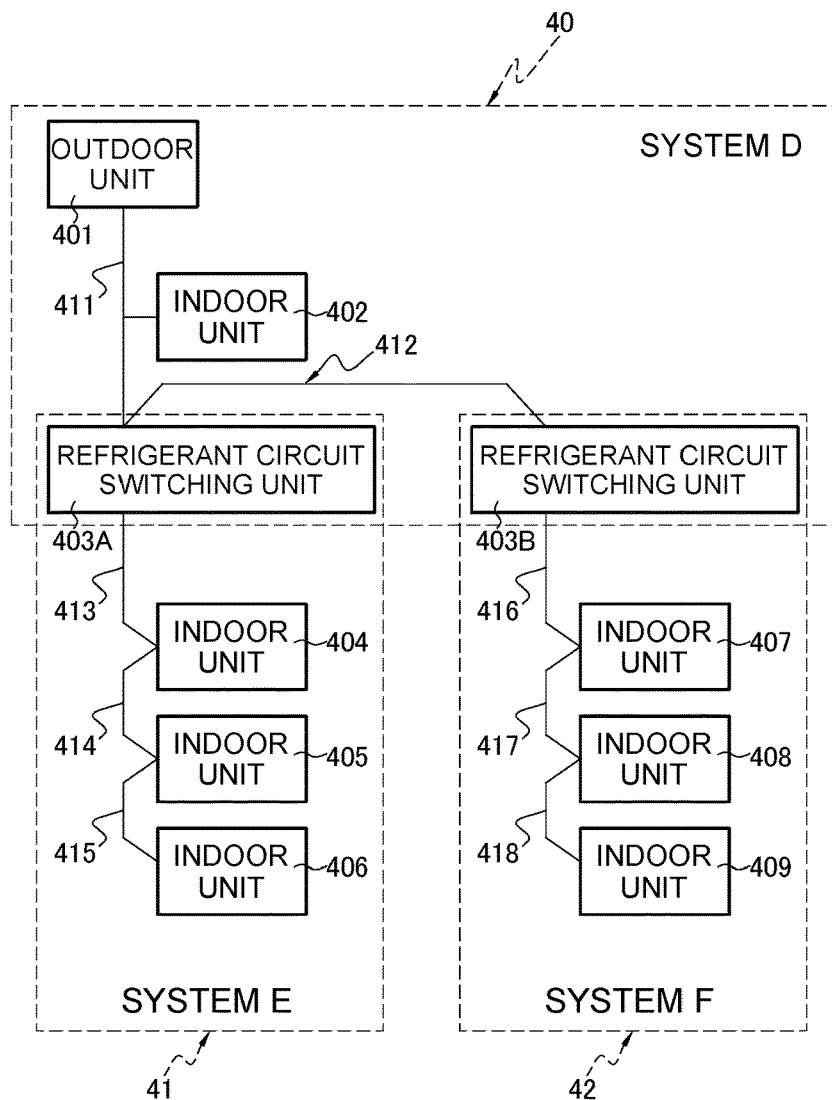
FIG. 5 is a configuration diagram of a cooling-heating simultaneous operation air conditioning system.

Subsequently, the indoor units 302, 303, and 304 serving as "objects to be recognized" that have received the detection signal each transmit a response by communication. The outdoor unit 301 serving as a "recognizer" recognizes that the indoor units 302, 303, and 304 serving as "objects to be recognized" from which responses have been received are devices belonging to the identical system, and stores information thereof (3) Application to Cooling-Heating Simultaneous Operation Air Conditioning System FIG. 5 is a configuration diagram of a cooling-heating simultaneous operation air conditioning system. In FIG. 5, the cooling-heating simultaneous operation air conditioning system is constituted by an outdoor unit, indoor units, and refrigerant circuit switching units each switching a refrigerant circuit between the outdoor unit and the indoor units. FIG. 5 illustrates one refrigerant system. It is necessary for refrigerant control to identify the indoor units connected downstream of each refrigerant circuit switching unit, and thus it is necessary to perform system recognition by dividing the system into three sub-systems D, E, and F.

In the system D, an outdoor unit 401, an indoor unit 402, and refrigerant circuit switching units 403A and 403B serving as devices are connected by lines 411 and 412.

In the system E, the refrigerant circuit switching unit 403A and indoor units 404, 405, and 406 serving as devices are connected by lines 413, 414, and 415. In the system F, the refrigerant circuit switching unit 403B and indoor units 407, 408, and 409 serving as devices are connected by lines 416, 417, and 418.

The refrigerant circuit switching unit 403A connects the system D and the system E, and the refrigerant circuit switching unit 403B connects the system D and the system F.

All the devices form one communication network. Communication between the individual devices is performed using a high frequency of 100 kHz or more.

In FIG. 5, the outdoor unit 401 of the system D, the refrigerant circuit switching unit 403A of the system E, and the refrigerant circuit switching unit 403B of the system F can become a "recognizer" in this refrigerant system.

One "recognizer" is selected from among the one outdoor unit 401 and the two refrigerant circuit switching units 403A and 403B. System recognition may be started from any system. For the sake of convenience, a description will be given in the order of the system D, the system E, and the system F.

(3-1) System D

For example, it is assumed that the outdoor unit 401 is selected as a "recognizer". In this case, the refrigerant circuit switching units 403A and 403B that are not selected as a "recognizer" temporarily become "objects to be recognized".

Subsequently, the outdoor unit 401 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the indoor unit 402 and the refrigerant circuit switching units 403A and 403B of the identical system, and the detection signal must not be transmitted to the indoor units 404, 405, and 406 disposed downstream of the refrigerant circuit switching unit 403A and to the indoor units 407, 408, and 409 disposed downstream of the refrigerant circuit switching unit 403B.

Subsequently, the indoor unit 402 and the refrigerant circuit switching units 403A and 403B serving as "objects to be recognized" that have received the detection signal each transmit a response by communication.

The outdoor unit 401 serving as a "recognizer" recognizes that the indoor unit 402 and the refrigerant circuit switching units 403A and 403B serving as "objects to be recognized" from which responses have been received are devices belonging to the identical system, and stores information thereof.

(3-2) System E

The outdoor unit 401 that has already been selected as a "recognizer" is excluded from candidates for the next "recognizer", and thus one "recognizer" is selected from among the two refrigerant circuit switching units 403A and 403B.

For example, if the refrigerant circuit switching unit 403A is selected as a "recognizer", the refrigerant circuit switching unit 403B that is not selected as a "recognizer" temporarily becomes an "object to be recognized".

Subsequently, the refrigerant circuit switching unit 403A serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the indoor units 404, 405, and 406 of the identical system, and the detection signal must not be transmitted to the indoor units 407, 408, and 409 disposed downstream of the refrigerant circuit switching unit 403B.

Subsequently, the indoor units 404, 405, and 406 serving as "objects to be recognized" that have received the detection signal each transmit a response by communication.

The refrigerant circuit switching unit 403A serving as a "recognizer" recognizes that the indoor units 404, 405, and 406 serving as "objects to be recognized" from which responses have been received are devices belonging to the identical system, and stores information thereof.

(3-3) System F

The outdoor unit 401 and the refrigerant circuit switching unit 403A that have already been selected as a "recognizer" are excluded from candidates for the next "recognizer", and thus the refrigerant circuit switching unit 403B becomes a "recognizer".

Subsequently, the refrigerant circuit switching unit 403B serving as a "recognizer" transmits a detection signal for system recognition to the indoor units 407, 408, and 409 serving as "objects to be recognized". A recognition signal having a low frequency of 10 kHz or less is used as the detection signal. The recognition signal having a low frequency includes a DC (0 Hz) signal.

At this time, the detection signal is transmitted only to the indoor units 407, 408, and 409 of the identical system, and the detection signal must not be transmitted to the indoor units 404, 405, and 406 disposed downstream of the refrigerant circuit switching unit 403A.

Subsequently, the indoor units 407, 408, and 409 serving as "objects to be recognized" that have received the detection signal each transmit a response by communication.

The refrigerant circuit switching unit 403B serving as a "recognizer" recognizes that the indoor units 407, 408, and 409 serving as "objects to be recognized" from which responses have been received are devices belonging to the identical system, and stores information thereof.

(4) Method of System Recognition

In the present application, high-frequency communication is adopted for communication, and a low-frequency signal having a frequency sufficiently away from the frequency used for communication is used as a signal for system recognition. This is referred to as a low-frequency signal detection method. In this method, a low-frequency signal is transmitted only to devices in an identical refrigerant system, and this is detected to recognize the devices in the identical system.

Figure 6:
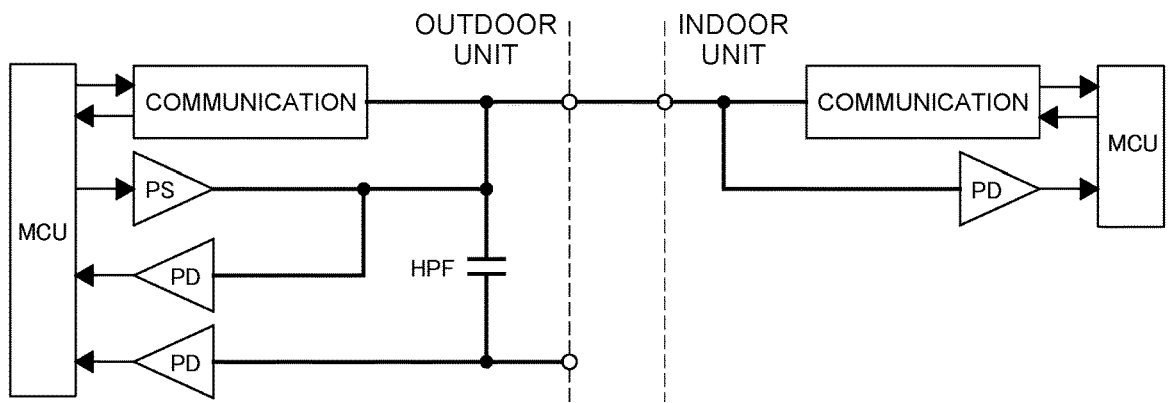
FIG. 6 is a circuit block diagram of a low-frequency signal detection method.

FIG. 6 is a circuit block diagram of a low-frequency signal detection method. One device (for example, an outdoor unit) is provided with a low-frequency signal transmitting circuit PS, two low-frequency signal receiving circuits PD, and a high pass filter HPF that inhibits transmission of a low-frequency signal and passes a high-frequency signal. The other device (for example, an indoor unit) is provided with a low-frequency signal receiving circuit PD.

The timing at which the outdoor unit transmits a low-frequency signal and the timing at which the indoor unit receives the low-frequency signal are coordinated each other, and the outdoor unit is notified that the indoor unit has detected the low-frequency signal. Accordingly, it can be recognized that both the devices are included in an identical refrigerant system.

(4-1) Case of Air Conditioning System

Figure 7:
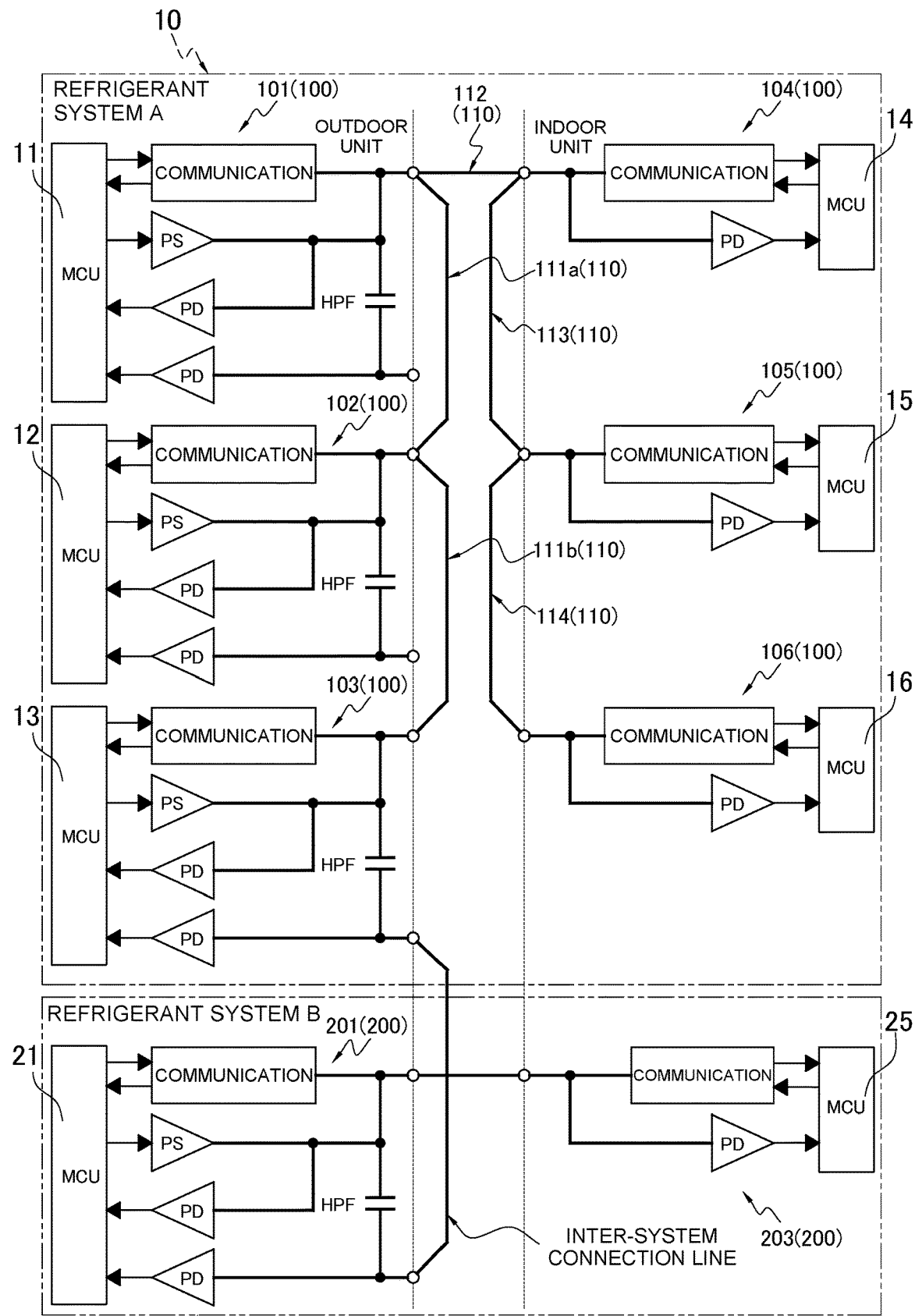
FIG. 7 is a circuit block diagram of the air conditioning system illustrated in FIG. 4.

FIG. 7 is a circuit block diagram of the air conditioning system illustrated in FIG. 4. For the sake of convenience, the refrigerant system A and part of the refrigerant system B are illustrated. In FIG. 7, the inter-system connection line has high pass filters HPF inserted thereinto, and thus a high-frequency communication signal passes therethrough. However, a low-frequency signal is prevented from being transmitted to the other systems.

Figure 8:
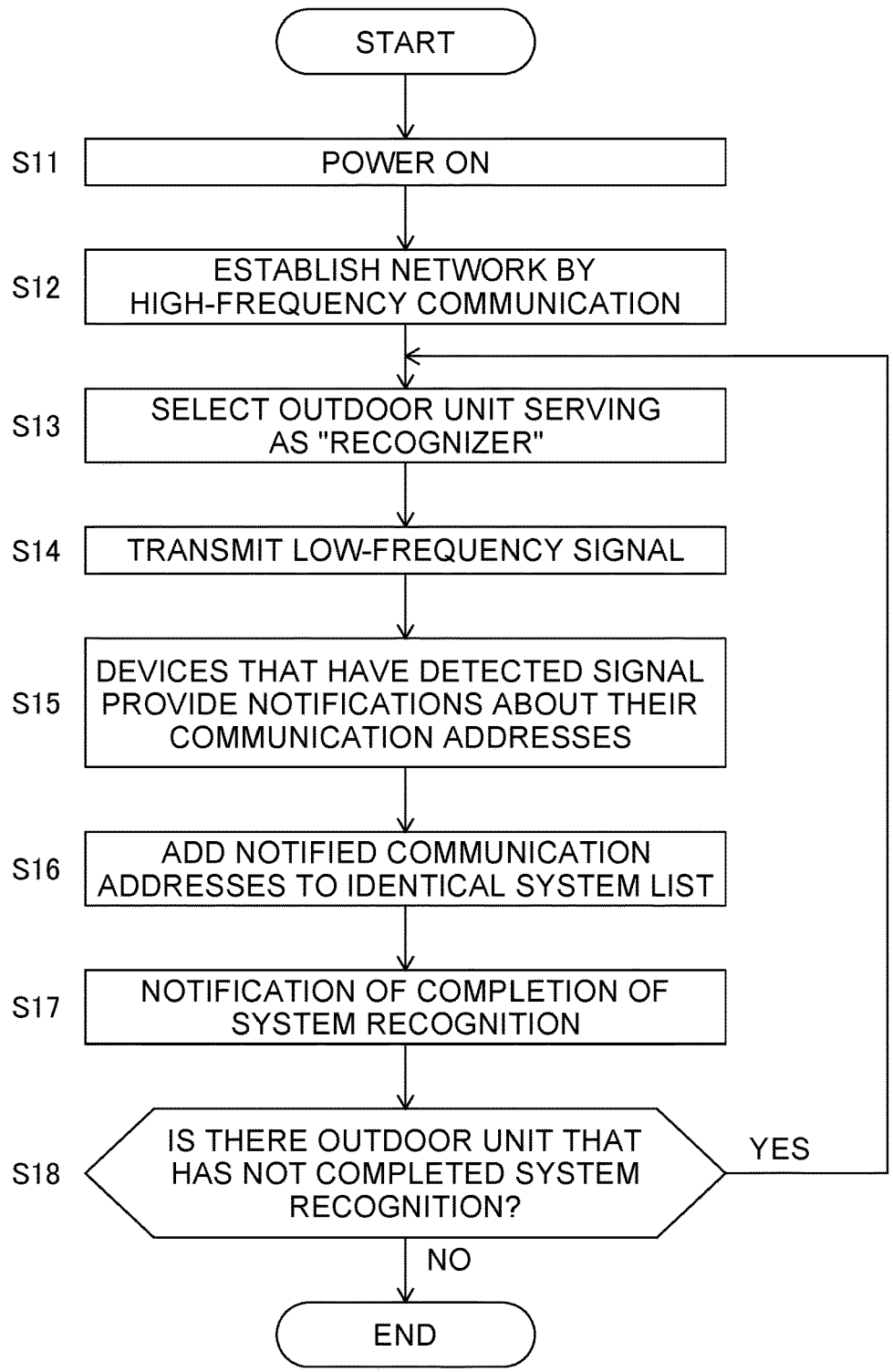
FIG. 8 is a flowchart of system recognition.

FIG. 8 is a flowchart of system recognition. Hereinafter, a procedure of system recognition will be described with reference to FIG. 7 and FIG. 8.

(Step S11)

Referring to FIG. 7 and FIG. 8, power is turned on in step S11.

(Step S12)

Subsequently, a network is established by high-frequency communication. Each device (outdoor unit, indoor unit) has a high-frequency communication circuit (see FIG. 7) and establishes a network by communication after power on.

(Step S13)

Subsequently, to recognize an outdoor unit and an indoor unit of an identical system, all the outdoor units cooperate with each other by communication and select one outdoor unit in the network as a "recognizer".

(Step S14)

The selected outdoor unit 101 notifies all the devices (the outdoor units 102, 103, and 201 and the indoor units 104, 105, 106, and 203) that a low-frequency signal is to be transmitted, and transmits a low-frequency signal from the low-frequency signal transmitting circuit PS. At the time of the notification, the selected outdoor unit 101 also provides a notification about an ID or communication address unique to the outdoor unit 101.

(Step S15)

After the notification from the selected outdoor unit 101, the outdoor units 102 and 103 and the indoor units 104, 105, and 106 that have detected the low-frequency signal provide notifications about their IDs or communication addresses to the ID or communication address notified in advance.

(Step S16)

The selected outdoor unit 101 adds the notified IDs or communication addresses to an identical system list.

(Step S17)

The selected outdoor unit 101 notifies the entire network that system recognition has been completed.

(Step S18)

If there is an outdoor unit that has not completed system recognition, the process returns to step S13, an outdoor unit that executes the next system recognition is selected in cooperation, and the process from step S13 to step S17 is performed.

(4-2) Case of Cooling-Heating Simultaneous Operation Air Conditioning System

The case of a cooling-heating simultaneous operation air conditioning system can be described by using FIG. 7. The details of step S11 and step S12 are the same as those described in "(4-1) Case of Air Conditioning System", and thus the description thereof is omitted. The details corresponding to step S13 to step S18 will be described as step S13B to step S18B.

(Step S13B)

In FIG. 5, the system D includes the one outdoor unit 401 and the two refrigerant circuit switching units 403A and 403B. Thus, a device serving as a "recognizer" is selected from among them. Hereinafter, a description will be given under the assumption that the outdoor unit 401 is selected as the first "recognizer".

(Step S14B)

Subsequently, the selected outdoor unit 401 notifies all the devices (the indoor units 402, 404, 405, 406, 407. 408, and 409, and the refrigerant circuit switching units 403A and 403B) that a low-frequency signal is to be transmitted, and transmits a low-frequency signal from the low-frequency signal transmitting circuit PS. At the time of the notification, the selected outdoor unit 401 also provides a notification about an ID or communication address unique to the outdoor unit 401.

(Step S15B)

After the notification from the selected outdoor unit 401, the indoor unit 402 and the refrigerant circuit switching units 403A and 403B that have detected the low-frequency signal provide notifications about their IDs or communication addresses to the ID or communication address notified in advance.

(Step S16B)

The selected outdoor unit 401 adds the notified IDs or communication addresses to an identical system list.

(Step S17B)

The selected outdoor unit 401 notifies the entire network that system recognition has been completed.

(Step S18B)

If there is a device (refrigerant circuit switching unit) that has not completed system recognition, the process returns to step S13B, a device that executes the next system recognition is selected in cooperation, and the process from step S13B to step S17B is performed.

(5) Process in a Case where Presence of Device Outside System is Detected During System Recognition Here, a description will be given of a processing method in a case where capacitive or inductive coupling between systems occurs and the presence of a device outside the system is detected during system recognition. For the sake of convenience, a description will be given by assuming two refrigerant systems and networks each being formed for a corresponding one of the refrigerant systems.

Figure 9A:
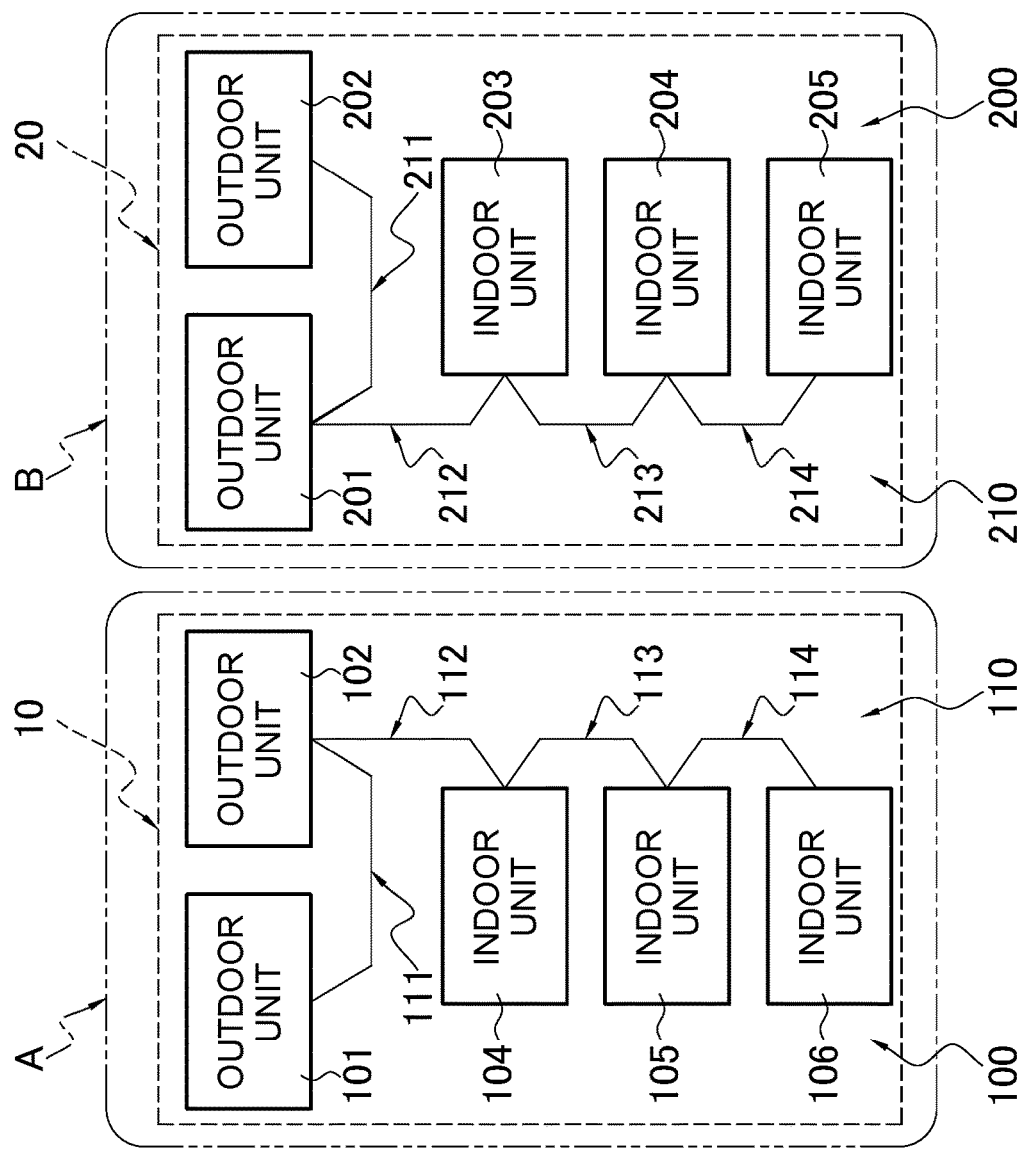
FIG. 9A is a configuration diagram of a state in which networks of devices are normally formed in an air conditioning system including two refrigerant systems.

FIG. 9A is a configuration diagram of a state in which networks of devices are normally formed in an air conditioning system including two refrigerant systems.

Referring to FIG. 9A, in the refrigerant system A, the outdoor units 101 and 102 and the indoor units 104, 105, and 106 are connected by the lines 111, 112, 113, and 114, and the devices connected by the line group form a first network 10.

In the refrigerant system B, the outdoor units 201 and 202 and the indoor units 203, 204, and 205 are connected by the lines 211, 212, 213, and 214, and the devices connected by the line group form a second network 20.

(5-1) First State in which Crosstalk Occurs

Figure 9B:
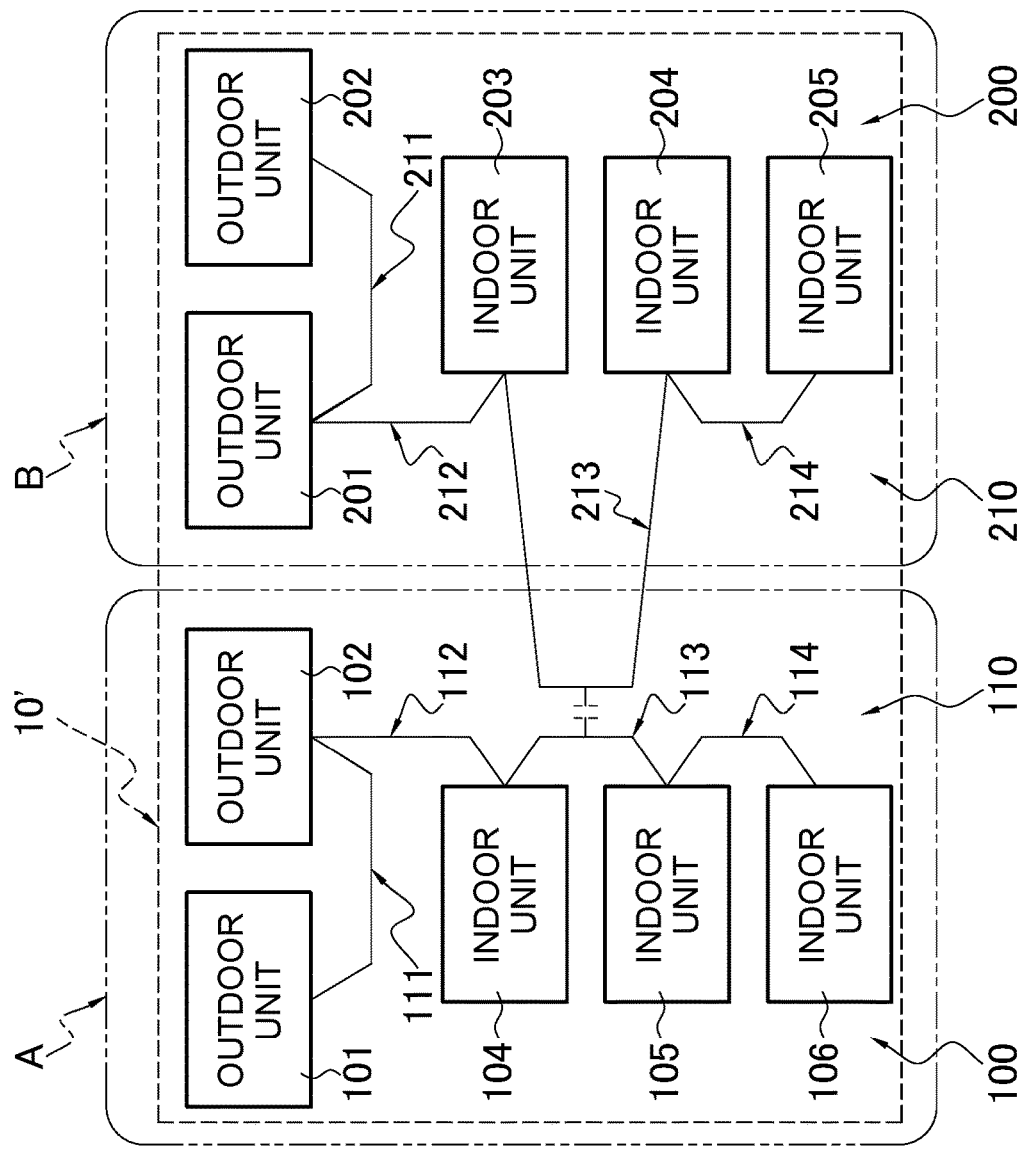
FIG. 9B is a configuration diagram of a state in which the two networks in FIG. 9A are coupled into one network.

FIG. 9B is a configuration diagram of a state in which the two networks in FIG. 9A are coupled into one network.

In FIG. 9B, the lines of the refrigerant system A and the refrigerant system B are close to each other and thus capacitive or inductive coupling occurs. As a result of a communication signal being transmitted to the other system due to crosstalk, the second network 20 couples to the first network 10 to form one first network 10'.

In this state, a device of the refrigerant system A is capable of communicating with a device of the refrigerant system B. If the system to which a device belongs can be set or can be detected by detection means, it is equivalent to a state in which devices are connected by an inter-system connection line, and thus no problem occurs in controlling air conditioners. However, if the coupling of crosstalk is weak, the amount of signal attenuation is large and communication quality decreases at a coupling portion of crosstalk. As a result, the processing ability per unit time of the entire network decreases.

(5-2) Second State in which Crosstalk Occurs

Figure 9C:
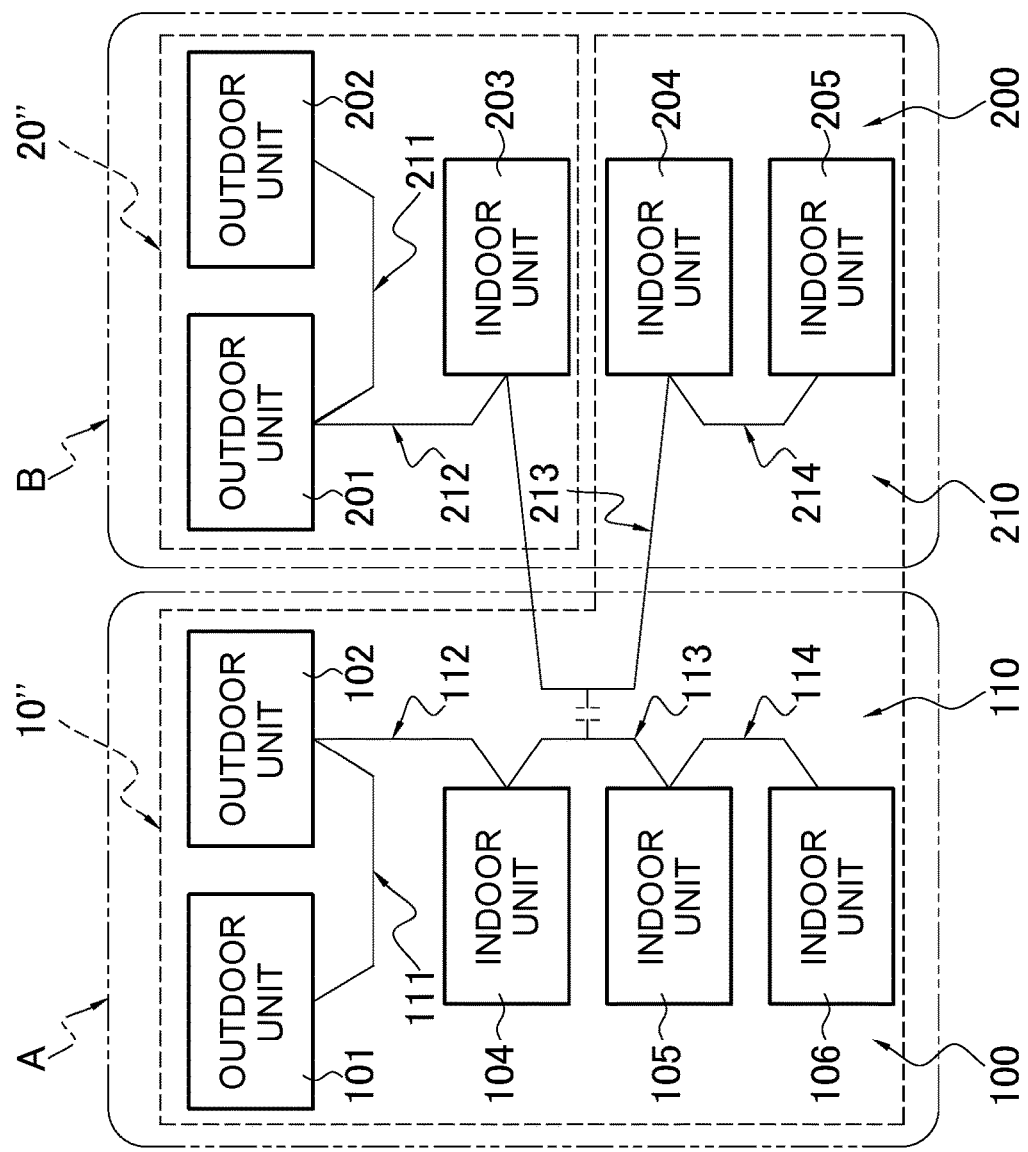
FIG. 9C is a configuration diagram of a state in which some of the devices in
FIG. 9A couple to the other network and two networks having a configuration different from the original configuration are formed.

FIG. 9C is a configuration diagram of a state in which some of the devices in FIG. 9A couple to the other network and two networks having a configuration different from the original configuration are formed.

In FIG. 9C, the lines of the refrigerant system A and the refrigerant system B are close to each other and thus capacitive or inductive coupling occurs. As a result of a communication signal being transmitted to the network of the other system due to crosstalk, some of the devices in the second network 20 (the indoor units 204 and 205) couple to the first network 10, and a virtual first network 10" and a virtual second network 20" are formed with a connection configuration different from the original connection configuration of the refrigerant systems.

Such networks are formed when communication adopts a master/slave protocol. This may occur as a result of a plurality of masters taking slaves under constraints that there is only one master in one network.

In this case, in the refrigerant system B, communication between the outdoor units 201 and 202 and the indoor units 204 and 205 is impossible and uncontrollable.

(5-3) Decoupling of Networks

To decouple the above-described networks coupled by crosstalk, it is necessary to determine that the networks and the refrigerant systems are in a mismatch state, cause a device in a mismatch state to leave the network to which the device belongs, search for another network, and connects the device to the network.

As means therefor, two types of methods can be considered, a method of setting the system to which a device belongs and a method of detecting a mismatch state by detection means.

(5-3-1) Method of Detecting Mismatch State

In system recognition, a low-frequency detection signal is transmitted to a device in an identical system, and the device that has received the detection signal responds by high-frequency communication. Thus, system recognition is performed after a communication network has been established.

As described in "(4) Method of System Recognition", each outdoor unit and each indoor unit have a high-frequency communication circuit, and establishes a network after power on.

A device participating in a network is capable of acquiring a unique ID or communication address by communication.

After all system recognition processes have been completed, a list of devices that have been subjected to system recognition is obtained. A device that is present in a communication network but is not recognized by system recognition and is absent in the list leaves or is caused to leave the communication network.

For example, in FIG. 9C, even if a state occurs in which the indoor units 204 and 205 of the refrigerant system B are recognized as being in the network of the refrigerant system A due to capacitive or inductive coupling, a device selected as a "recognizer" (for example, the outdoor unit 101) performs system recognition and notifies the entire network that system recognition has been completed. At that time, the indoor units 204 and 205 recognize that the indoor units 204 and 205 have not been recognized, and leave the network.

(5-3-2) Method of Setting System to which Device Belongs

Crosstalk may occur due to movement of a line or the like after a network has been established, even if crosstalk does not occur during establishment of the network. For example, if lines are made close to each other and crosstalk occurs, a network is reestablished.

In this case, an identical system list has been created by the latest system recognition, and thus a device that is not registered in the list may be caused to leave after system recognition is performed again.

(6) Features (6-1) Case of Air Conditioning System (6-1-1)

In the device network system, the outdoor unit 101 selected from among all the outdoor units 101, 102, and 103 of the first network 10 performs a recognition process on the outdoor units 102 and 103 and the indoor units 104, 105, and 106 of the first network 10. In the first network 10, communication between the individual devices including the outdoor units 101, 102, and 103 and the indoor units 104, 105, and 106 is performed by using a high frequency, and the recognition process performed by the selected outdoor unit 101 uses a recognition signal having a low frequency.

As a result, in the system recognition of a first device group of the first network, recognition of a device of another network that is not physically connected is avoided.

(6-1-2)

In the device network system, the outdoor unit 201 selected from among all the outdoor units 201 and 202 of the second network 20 performs a recognition process on the outdoor unit 202 and the indoor units 203, 204, and 205 of the second network 20.

(6-1-3)

In the device network system, the outdoor unit 301 performs a recognition process on the indoor units 302, 303, and 304 of a third network 30.

(6-1-4)

In the second network 20, communication between the individual devices including the outdoor units 201 and 202 and the indoor units 203, 204, and 205 is performed by using a high frequency, and the recognition process performed by the selected outdoor unit 201 uses a recognition signal having a low frequency. As a result, in the system recognition of a second device group of the second network, recognition of a device of another network that is not physically connected is avoided.

(6-1-5)

In the third network 30, communication between the individual devices including the outdoor unit 301 and the indoor units 302, 303, and 304 is performed by using a high frequency, and the recognition process performed by the selected outdoor unit 301 uses a recognition signal having a low frequency. As a result, in the system recognition of a third device group of the third network, recognition of a device of another network that is not physically connected is avoided.

(6-2) Case of Cooling-Heating Simultaneous Operation Air Conditioning System (6-2-1)

In the device network system, the outdoor unit 401 selected from among the outdoor unit 401 and the refrigerant circuit switching units 403A and 403B of a network 40 performs a recognition process on the indoor unit 402 and the refrigerant circuit switching units 403A and 403B of the network 40. In the network 40, communication between the individual devices including the outdoor unit 401, the indoor unit 402, and the refrigerant circuit switching units 403A and 403B is performed by using a high frequency, and the recognition process performed by the selected outdoor unit 401 uses a recognition signal having a low frequency. As a result, in the system recognition of a device group of the network 40, recognition of a device of another network that is not physically connected is avoided.

(6-2-2)

In the device network system, the refrigerant circuit switching unit 403A performs a recognition process on the indoor units 404, 405, and 406 of a network 41.

(6-2-3)

In the device network system, the refrigerant circuit switching unit 403B performs a recognition process on the indoor units 407, 408, and 409 of a network 42.

(6-2-4)

In the network 41, communication between the individual devices including the refrigerant circuit switching unit 403A and the indoor units 404, 405, and 406 is performed by using a high frequency, and the recognition process performed by the refrigerant circuit switching unit 403A uses a recognition signal having a low frequency. As a result, in the system recognition of a device group of the network 41, recognition of a device of another network that is not physically connected is avoided.

(6-2-5)

In the network 42, communication between the individual devices including the refrigerant circuit switching unit 403B and the indoor units 407, 408, and 409 is performed by using a high frequency, and the recognition process performed by the refrigerant circuit switching unit 403B uses a recognition signal having a low frequency. As a result, in the system recognition of a device group of the network 42, recognition of a device of another network that is not physically connected is avoided.

(6-3) Common Features
(6-3-1)
The high frequency is a frequency of 100 kHz or more.
(6-3-2)
The low frequency is a frequency of 10 kHz or less.

Second Embodiment

Here, a description will be given of a configuration in which the reliability of communication is increased in a device network having a configuration in which a plurality of devices are grouped into a plurality of groups and devices belonging to each group are capable of communicating with each other within a network corresponding to the group and are also capable of communicating with a device outside the group.

(1) Overall Configuration

Figure 10:
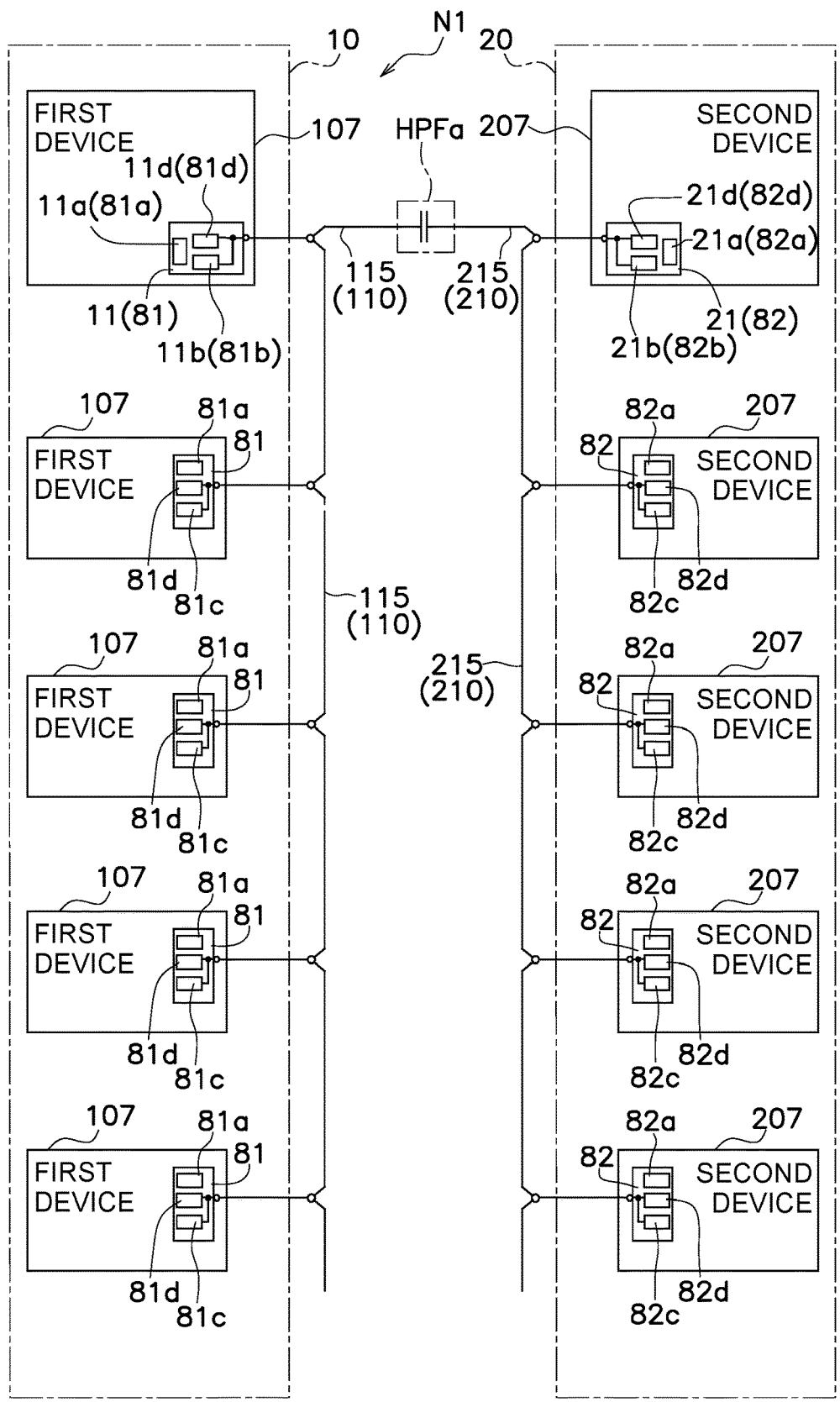
FIG. 10 is a conceptual diagram illustrating an overview of one configuration example of a device network system according to a second embodiment.

A device network system N1 illustrated in FIG. 10 includes a first network 10 including a plurality of first devices 107, a second network 20 including a plurality of second devices 207, a first processing unit 11, a second processing unit 21, and a first filter HPFa.

The first processing unit 11 transmits a first recognition signal which has a low frequency and which is for recognizing the plurality of first devices 107 as devices of an identical group. The first filter HPFa is disposed between the first network 10 and the second network 20. The first filter HPFa passes a communication signal which has a high frequency and which is for communication between the first devices 107 and the second devices 207, and blocks the first recognition signal having a low frequency.

In the present disclosure, a low-frequency signal is defined as a signal having a frequency of 10 KHz or less. The low-frequency signal includes a direct current (a signal having a frequency of 0 Hz). In the present disclosure, a high-frequency signal is defined as a signal having a frequency of 100 KHz or more. The first filter HPFa has a cutoff frequency between the frequency of the communication signal and the frequency of the first recognition signal.

The first filter HPFa is disposed between the first network 10 and the second network 20. In other words, the first network 10 and the second network 20 are connected via the first filter HPFa. Thus, both the first network 10 and the second network 20 are capable of transmitting a signal that passes through the first filter HPFa. The device network system N1 causes the first processing unit 11 to transmit a first recognition signal, and transmits the first recognition signal to the first network 10. The first network 10 is capable of causing a first recognition signal to be transmitted therein. However, the first recognition signal is blocked by the first filter HPFa, and thus the second network 20 is incapable of causing the first recognition signal to be transmitted therein.

The plurality of first devices 107 of the first network 10 are each configured to be capable of receiving the first recognition signal transmitted by the first network 10. The plurality of first devices 107 that have received the first recognition signal are configured to be capable of performing transmission to and reception from the first processing unit 11 by using a communication signal. As a result, the first processing unit 11 is capable of recognizing that the plurality of first devices 107 capable of receiving the first recognition signal belong to the first network 10.

Here, the plurality of second devices 207 of the second network 20 are configured to be capable of recognizing that the plurality of second devices 207 belong to the second network 20 by using a second recognition signal transmitted by the second network 20. However, the second network 20 does not necessarily have such a function of performing system recognition using a second recognition signal.

The second processing unit 21 transmits a second recognition signal which has a low frequency and which is for recognizing the plurality of second devices 207 as devices of an identical group. The first filter HPFa is disposed between the first network 10 and the second network 20. The first filter HPFa passes a communication signal which has a high frequency and which is for communication between the first devices 107 and the second devices 207, and blocks a second recognition signal having a low frequency.

The device network system N1 causes the second processing unit 21 to transmit a second recognition signal, and transmits the second recognition signal to the second network 20. The second network 20 is capable of causing a second recognition signal to be transmitted therein. However, the second recognition signal is blocked by the first filter HPFa, and thus the first network 10 is incapable of causing the second recognition signal to be transmitted therein.

The plurality of second devices 207 of the second network 20 are each configured to be capable of receiving the second recognition signal transmitted by the second network 20. The plurality of second devices 207 that have received the second recognition signal are configured to be capable of performing transmission to and reception from the second processing unit 21 by using a communication signal. As a result, the second processing unit 21 is capable of recognizing that the plurality of second devices 207 capable of receiving the second recognition signal belong to the second network 20.

(2) Detailed Configuration

Each first device 107 includes an intra-device controller 81 that controls an internal mechanism of the first device 107. The intra-device controller 81 includes, for example, a microcontroller unit (MCU) 81a, a receiver 81c, and a transceiver 81d. The receiver 81c is configured to be capable of receiving a first recognition signal having a low frequency. The transceiver 81d is configured to be capable of performing communication by using a communication signal having a high frequency.

Here, a description will be given of a case in which one of the intra-device controllers 81 of the plurality of first devices 107 is configured to function as the first processing unit 11. However, the first processing unit 11 can be configured as a unit different from the intra-device controller 81. Here, a description will be given of a case in which the first processing unit 11 is disposed inside the first device 107. Alternatively, the first processing unit 11 can be disposed outside the first device 107. In a case where the first processing unit 11 is disposed outside the first device 107, the first processing unit 11 can be configured to notify the first devices 107 of a result of system recognition as necessary. With such notification, each of the plurality of first devices 107 is capable of recognizing that the first devices 107 other than the first device 107 belong to the first network.

In the description of the embodiment, the "first processing unit" is also denoted by a reference sign different from the reference sign denoting an "intra-device controller" so as to distinguish the intra-device controller 81 functioning as the first processing unit 11 from the other intra-device controllers 81. The first processing unit 11 includes, for example, a microcontroller unit (MCU) 11a, a transmitter 11b, and a transceiver 11d. The transmitter 11b is configured to be capable of transmitting a first recognition signal having a low frequency. The transceiver 11d is configured to be capable of performing communication by using a communication signal having a high frequency.

In the present disclosure, if the intra-device controller 81 functioning as the first processing unit 11 has a function of transmitting a first recognition signal, a description of communication for system recognition can be given even if the first processing unit 11 does not have a function of receiving a first recognition signal. Thus, in the present disclosure, it is described that the intra-device controller 81 functioning as the first processing unit 11 has the transmitter 11b (81b). Also, in the present disclosure, if the intra-device controller 81 not functioning as the first processing unit 11 has a function of receiving a first recognition signal, a description of communication for system recognition can be given even if the intra-device controller 81 does not have a function of transmitting a first recognition signal. Thus, in the present disclosure, it is described that the intra-device controller 81 not functioning as the first processing unit 11 has the receiver 81c. In a case where the first processing unit 11 is provided separately from the intra-device controller 81, the intra-device controllers 81 of all the first devices 107 each have the receiver 81c.

The transmitter 81b (11b), the receivers 81c, and the transceivers 81d of the plurality of first devices 107 are connected to a physical first transmission line 115. The physical first transmission line 115 is physically connected to one input/output end of the first filter HPFa. The first transmission line 115 may be constituted by a plurality of wires extending in parallel.

The MCU includes, for example, a control calculation device and a storage device (memory). As the control calculation device, a processor such as a CPU or a GPU may be used. The control calculation device reads out a program stored in the storage device and performs predetermined image processing or calculation processing in accordance with the program. Furthermore, the control calculation device is capable of writing a calculation result in the storage device and reading out information stored in the storage device in accordance with the program.

Each second device 207 includes an intra-device controller 82 that controls an internal mechanism of the second device 207. The intra-device controller 82 includes, for example, a microcontroller unit (MCU) 82a, a receiver 82c, and a transceiver 82d. The receiver 82c is configured to be capable of receiving a second recognition signal having a low frequency. The transceiver 82d is configured to be capable of performing communication by using a communication signal having a high frequency.

Here, a description will be given of a case in which one of the intra-device controllers 82 of the plurality of second devices 207 is configured to function as the second processing unit 21. However, the second processing unit 21 can be configured as a unit different from the intra-device controller 82 or can be installed outside the second device 207, like the first processing unit 11.

The "second processing unit" is also denoted by a reference sign different from the reference sign denoting an "intra-device controller" so as to distinguish the intra-device controller 82 functioning as the second processing unit 21 from the other intra-device controllers 82. The second processing unit 21 includes, for example, a microcontroller unit (MCU) 21a, a transmitter 21b, and a transceiver 21d. The transmitter 21b is configured to be capable of transmitting a second recognition signal having a low frequency. The transceiver 21d is configured to be capable of performing communication by using a communication signal having a high frequency.

In the present disclosure, if the intra-device controller 82 functioning as the second processing unit 21 has a function of transmitting a second recognition signal, a description of communication for system recognition can be given even if the second processing unit 21 does not have a function of receiving a second recognition signal. Thus, in the present disclosure, it is described that the intra-device controller 82 functioning as the second processing unit 21 has the transmitter 21b (82b). Also, in the present disclosure, if the intra-device controller 82 not functioning as the second processing unit 21 has a function of receiving a second recognition signal, a description of communication for system recognition can be given even if the intra-device controller 82 does not have a function of transmitting a second recognition signal. Thus, in the present disclosure, it is described that the intra-device controller 82 not functioning as the second processing unit 21 has the receiver 82c. In a case where the second processing unit 21 is provided separately from the intra-device controller 82, the intra-device controllers 82 of all the second devices 207 each have the receiver 82c.

The transmitter 82b (21b), the receivers 82c, and the transceivers 82d of the plurality of second devices 207 are connected to a physical second transmission line 215. The physical second transmission line 215 is physically connected to the other input/output end of the first filter HPFa. The second transmission line 215 may be constituted by a plurality of wires extending in parallel.

The first filter HPFa is a device that passes a high-frequency signal and blocks a low-frequency signal. A filter that passes a high-frequency signal and blocks a low-frequency signal in a passive manner may be, for example, a capacitor or an attenuator that attenuates a low-frequency signal. For example, an inductive coupler that passes a high-frequency signal and blocks a direct-current signal can be used as the first filter HPFa. A filter used as the first filter HPFa may be an active filter using an active element. A filter that passes a high-frequency signal and blocks a low-frequency signal may be, for example, a switching device that switches between connection and non-connection between the first transmission line 115 and the second transmission line 215. To switch between connection and non-connection between the first transmission line 115 and the second transmission line 215 in the switching device, a relay can be used, for example.

(3) Communication for System Recognition

A flow of communication for system recognition will be described with reference to FIG. 11. The system recognition herein means that the first processing unit 11 determines the plurality of first devices 107 belonging to the first network 10. The system recognition also means that the second processing unit 21 determines the plurality of second devices 207 belonging to the second network 20. To perform communication for system recognition, the power of the device network system N1 is turned on (step ST1). The intra-device controllers 81 and the first processing unit 11 connected to the first transmission line 115, and the intra-device controllers 82 and the second processing unit 21 connected to the second transmission line 215 establish a communication network (step ST2). For example, the intra-device controllers 81 and 82, the MCU 11a of the first processing unit 11, and the MCU 21a of the second processing unit 21 perform transmission and reception of communication signals by using the transceivers 81d, 82d, 11d, and 21d, thereby establishing a communication network.

After establishing the communication network, the plurality of first devices 107, the plurality of second devices 207, the first processing unit 11, and the second processing unit 21 each acquire a communication address (step ST3). The MCUs 81a and 82a of the intra-device controllers 81 and 82, the MCU 11a of the first processing unit 11, and the MCU 21a of the second processing unit 21 each have, for example, a function of automatically acquiring a communication address. With use of this function, the plurality of first devices 107, the plurality of second devices 207, the first processing unit 11, and the second processing unit 21 are capable of acquiring communication addresses different from each other.

The first processing unit 11 and the second processing unit 21 cooperate with each other by communication using the transceivers 11d and 21d to select one uncompleted processing unit (step ST4). Here, for example, the first processing unit 11 is selected.

The selected processing unit transmits, by using the transmitter, a recognition signal for system recognition to the devices of the network to which the processing unit belongs (step ST5). For example, if the first processing unit 11 is selected, the first processing unit 11 transmits a first recognition signal for system recognition to the first transmission line 115 by using the transmitter 11b. The first recognition signal transmitted by the transmitter 11b is a low-frequency signal, and is thus blocked by the first filter HPFa. Thus, due to the first filter HPFa, the receivers 82c of the second devices 207 are incapable of receiving the first recognition signal transmitted by the transmitter 11b of the first processing unit 11. The first processing unit 11 transmits its communication address in the form of a communication signal by using the transceiver 11d at the same time of or before or after transmitting the first recognition signal. In this case, the first processing unit 11 may be configured to transmit a communication address in the form of a low-frequency signal having a frequency that is not 0. The first devices 107 that have received the first recognition signal by using the receivers 81c and received the communication address of the first processing unit 11 by using the transceivers 81d or the receivers 81c through the first transmission line 115 store the received communication address in the memories of the respective MCUs 81a.

The intra-device controllers that have received the recognition signal and the communication address of the processing unit transmit their communication addresses to the communication address of the device having the processing unit (step ST6). If the first processing unit 11 is selected, the intra-device controllers 81 of the plurality of first devices 107 transmit their communication addresses to the communication address of the first device 107 including the first processing unit 11 through the first transmission line 115 by using the transceivers 81d.

The selected processing unit registers the received communication addresses of the intra-device controllers in an identical system list in which the devices of an identical network are to be registered (step ST7). If the first processing unit 11 is selected, the first processing unit 11 sequentially adds, in the identical system list, the communication addresses of the first devices 107 transmitted to the communication address of the first processing unit 11 through the first transmission line 115. The first device 107 including the intra-device controller 81 functioning as the first processing unit 11 causes the first processing unit 11 to recognize that the first device 107 belongs to the first network 10 by functioning as the first processing unit 11.

After the selected processing unit has completed registering all the devices of the network (system) to which the processing unit belongs, the processing unit notifies the entire device network system N1 that the system recognition of the system to which the processing unit belongs has been completed (step ST8). If the first processing unit 11 is selected, after the first processing unit 11 has completed registering the first devices 107 of the first network 10, the first processing unit 11 notifies, through the first transmission line 115 and the second transmission line 215 by using the transceiver 11d, the entire device network system N1 that the system recognition of the first network 10 has been completed.

It is determined whether there is a processing unit that has not completed system recognition (step ST9). If the first processing unit 11 is selected first, even after system recognition by the first processing unit 11 is completed, system recognition of the second network 20 by the second processing unit 21 is not completed (Yes in step ST9). In this case, the first processing unit 11 and the second processing unit 21 cooperate with each other by communication using the transceivers 11d and 21d to select the second processing unit 21 (step ST4).

If the second processing unit 21 is selected, the operation from step ST5 to step ST8 is repeated as in the above-described case where the first processing unit 11 is selected.

After system recognition of the first network 10 and the second network 20 by the first processing unit 11 and the second processing unit 21 has finished, there is no processing unit that has not completed system recognition (No in step ST9), and thus communication for system recognition ends.

In the above-described example of communication for system recognition, a description has been given of the case of specifying a communication destination and/or a communication source by using a communication address in communication using a communication signal through the first transmission line 115 and the second transmission line 215 performed by the transceivers 81d, 82d, 11d, and 21d. However, specification of a communication destination and/or a communication source is not limited to specification using a communication address. For example, the device network system N1 may be configured to specify a communication destination and/or a communication source by using unique IDs of the plurality of first devices 107 and the plurality of second devices 207.

(4) Features of Second Embodiment (4-1)

In the device network system N1 according to the second embodiment, the first filter HPFa prevents a first recognition signal for recognizing the plurality of first devices 107 as devices of an identical group from being transmitted to the second network 20. As a result of the first recognition signal being blocked by the first filter HPFa, the first recognition signal enables the plurality of first devices 107 of the first network 10 to be recognized while being distinguished from the plurality of second devices 207 of the second network 20. Between the first network 10 and the second network 20, the plurality of first devices 107 and the plurality of second devices 207 are capable of communicating with each other by using communication signals.

(4-2)

In the device network system N1 according to the second embodiment, as a result of the second recognition signal being blocked by the first filter HPFa, the second recognition signal enables the plurality of second devices 207 of the second network 20 to be recognized while being distinguished from the plurality of first devices 107 of the first network 10.

(4-3)

The above-described device network system N1 can be configured by using the first filter HPFa including a capacitor or a relay. The capacitor or the relay makes it easy to implement the device network system N1.

Third Embodiment (1) Overall Configuration

Figure 12:
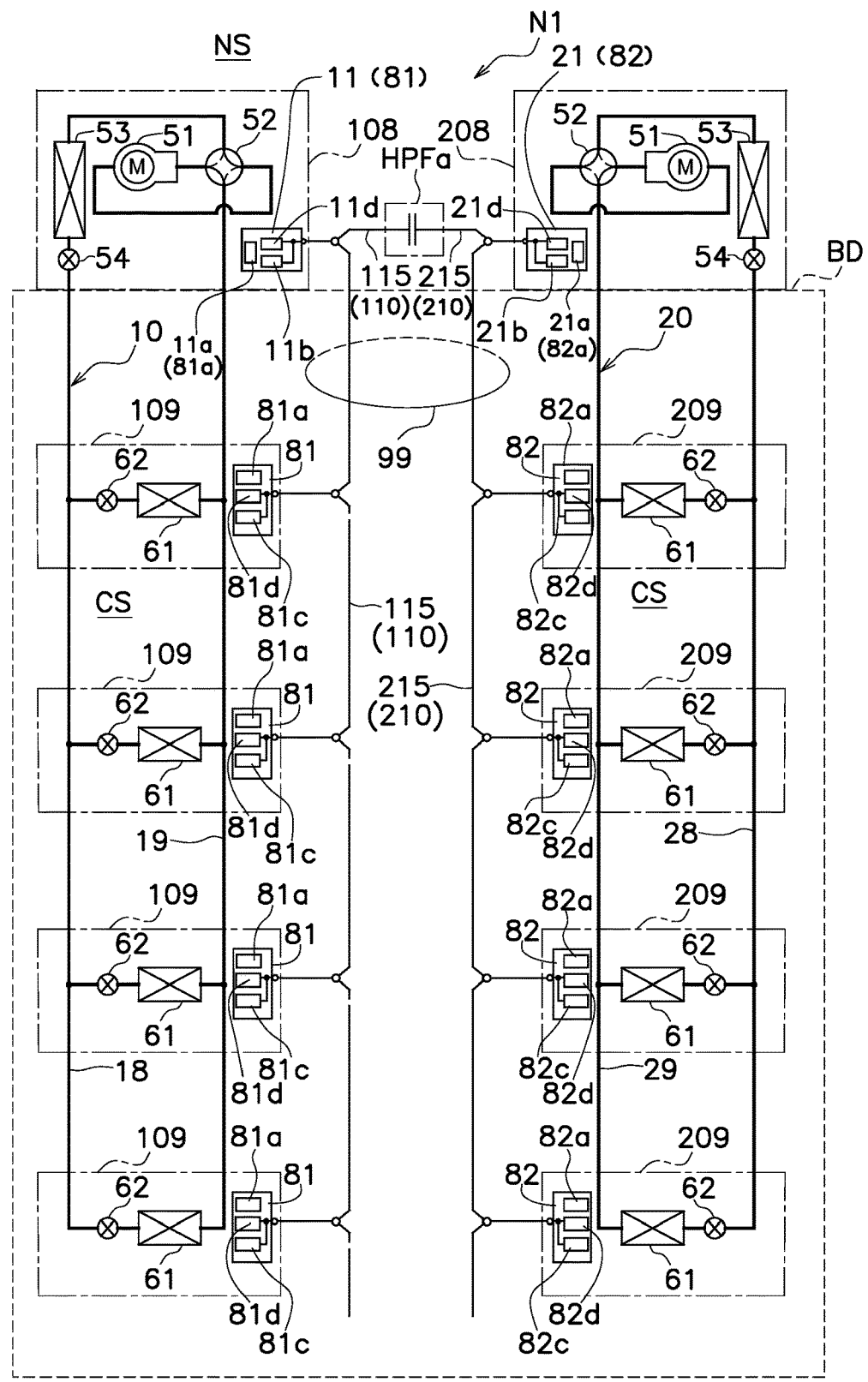
FIG. 12 is a circuit diagram illustrating an overview of one configuration example of a device network system according to a third embodiment.

The device network system N1 illustrated in FIG. 12 is a system according to a third embodiment and is an air conditioning system. The device network system N1 according to the third embodiment is, for example, installed in one building BD. In the following description, an air conditioning target space CS is a space in which indoor air is present, and is, for example, a space in a room in the building BD. An air conditioning non-target space NS is a space in which outdoor air is present, and is, for example, an outdoor space. In other words, the air conditioning target space CS is present inside the building BD, and the air conditioning non-target space NS is present outside the building BD.

Here, a description will be given of a case where the device network system N1 which is an air conditioning system is installed in one building BD. However, the device network system N1 may be installed in a plurality of buildings. In the device network system N1, the first network 10 corresponds to a first refrigerant system, and the second network 20 corresponds to a second refrigerant system. First refrigerant circulates in the first refrigerant system. Second refrigerant circulates in the second refrigerant system. The device network system N1 is configured so that the first refrigerant does not flow into the second refrigerant system of the second network 20 and that the second refrigerant does not flow into the first refrigerant system of the first network 10.

The device network system N1 includes a first outdoor unit 108, a plurality of first indoor units 109, a second outdoor unit 208, and a plurality of second indoor units 209. First refrigerant flows through the first outdoor unit 108 and the plurality of first indoor units 109. Second refrigerant flows through the second outdoor unit 208 and the plurality of second indoor units 209. The first outdoor unit 108 and the plurality of first indoor units 109 are a plurality of first devices. The second outdoor unit 208 and the plurality of second indoor units 209 are a plurality of second devices.

The device network system N1 includes a communication line 99 that connects the first outdoor unit 108, the plurality of first indoor units 109, the second outdoor unit 208, and the plurality of second indoor units 209.

In the device network system N1 illustrated in FIG. 12, the communication line 99 includes a physical first transmission line 115, second transmission line 215, and first filter HPFa. The first transmission line 115 and the second transmission line 215 are connected via the first filter HPFa. The first outdoor unit 108 and the plurality of first indoor units 109 are connected to the physical first transmission line 115. A first recognition signal transmitted through the first transmission line 115 enables the first outdoor unit 108 and the plurality of first indoor units 109 to communicate with each other. The first recognition signal is blocked by the first filter HPFa and is not transmitted from the first transmission line 115 to the second transmission line 215. Thus, the second outdoor unit 208 and the plurality of second indoor units 209 that are not connected to the first transmission line 115 are incapable of communicating with the first outdoor unit 108 and the plurality of first indoor units 109 by using the first recognition signal.

The second outdoor unit 208 and the plurality of second indoor units 209 are connected to the physical second transmission line 215. A second recognition signal transmitted through the second transmission line 215 enables the second outdoor unit 208 and the plurality of second indoor units 209 to communicate with each other. The second recognition signal is blocked by the first filter HPFa and is not transmitted from the second transmission line 215 to the first transmission line 115. Thus, the first outdoor unit 108 and the plurality of first indoor units 109 that are not connected to the second transmission line 215 are incapable of communicating with the second outdoor unit 208 and the plurality of second indoor units 209 by using the second recognition signal.

A communication signal is capable of passing through the first filter HPFa. Thus, the communication line 99 is capable of allowing a communication signal to be transmitted from the physical first transmission line 115 to the physical second transmission line 215, and allowing a communication signal to be transmitted from the physical second transmission line 215 to the physical first transmission line 115. The communication signal transmitted through the first transmission line 115 and the second transmission line 215 enables the first outdoor unit 108, the plurality of first indoor units 109, the second outdoor unit 208, and the plurality of second indoor units 209 to communicate with each other.

Thus, the device network system N1 according to the third embodiment is capable of recognizing the first outdoor unit 108 and the plurality of first indoor units 109 as first devices belonging to the first refrigerant system by using a first recognition signal. The device network system N1 is capable of recognizing the second outdoor unit 208 and the plurality of second indoor units 209 as second devices belonging to the second refrigerant system by using a second recognition signal.

(2) Detailed Configuration (2-1) First Outdoor Unit 108 and Second Outdoor Unit 208

The first refrigerant system includes the first outdoor unit 108 and the plurality of first indoor units 109 connected by refrigerant pipes 18 and 19 for circulating first refrigerant. First refrigerant flows through the refrigerant pipes 18 and 19. The second refrigerant system includes the second outdoor unit 208 and the plurality of second indoor units 209 connected by refrigerant pipes 28 and 29 for circulating second refrigerant. Second refrigerant flows through the refrigerant pipes 28 and 29. In the device network system N1, a vapor compression refrigeration cycle is performed by using first refrigerant in the first refrigerant system, and a vapor compression refrigeration cycle is performed by using second refrigerant in the second refrigerant system. The vapor compression refrigeration cycle in the first refrigerant system and the vapor compression refrigeration cycle in the second refrigerant system are performed independently of each other. However, the vapor compression refrigeration cycle performed in the first refrigerant system and the vapor compression refrigeration cycle performed in the second refrigerant system may be associated with each other. To control the device network system N1, for example, a temperature of indoor air in the air conditioning target space CS, temperatures and pressures of first refrigerant at individual positions, and temperatures and pressures of second refrigerant at individual positions are detected. A description of a sensor or the like used for the detection is omitted.

In the device network system N1 according to the third embodiment, the intra-device controller 81 of the first outdoor unit 108 functions as the first processing unit 11 described in the second embodiment. The intra-device controller 82 of the second outdoor unit 208 functions as the second processing unit 21 described in the second embodiment.

The first outdoor unit 108 and the second outdoor unit 208 each include a compressor 51, a four-way valve 52, a heat-source-side heat exchanger 53, and a heat-source-side expansion valve 54. The intra-device controllers 81 and 82 each control the compressor 51, the four-way valve 52, and the heat-source-side expansion valve 54.

First refrigerant flows through the compressor 51, the four-way valve 52, the heat-source-side heat exchanger 53, and the heat-source-side expansion valve 54 of the first outdoor unit 108. Second refrigerant flows through the compressor 51, the four-way valve 52, the heat-source-side heat exchanger 53, and the heat-source-side expansion valve 54 of the second outdoor unit 208.

The compressor 51 is a device that sucks refrigerant in a low-pressure gas state, compresses the refrigerant, and discharges refrigerant in a high-pressure gas state. The four-way valve 52 is a device that includes four ports: a first port; a second port; a third port; and a fourth port, and that is configured to switch the connection state between the ports. The heat-source-side heat exchanger 53 is a device that allows heat exchange to be performed between refrigerant and outdoor air. The heat-source-side expansion valve 54 is a device that decompresses refrigerant in a gas state. The first port of the four-way valve 52 is connected to a discharge port of the compressor 51, the second port is connected to one inlet/outlet of the heat-source-side heat exchanger 53, the third port is connected to a suction port of the compressor 51, and the fourth port is connected to the refrigerant pipe 19 or the refrigerant pipe 29. The four-way valve 52 switches between a state in which refrigerant flows between the first port and the second port and refrigerant flows between the third port and the fourth port, and a state in which refrigerant flows between the first port and the fourth port and refrigerant flows between the second port and the third port. The other inlet/outlet of the heat-source-side heat exchanger 53 is connected to one inlet/outlet of the heat-source-side expansion valve 54. The other inlet/outlet of the heat-source-side expansion valve 54 is connected to the refrigerant pipe 18 or the refrigerant pipe 28.

(2-2) First Indoor Unit 109 and Second Indoor Unit 209

Each first indoor unit 109 and each second indoor unit 209 each include a use-side heat exchanger 61, a use-side expansion valve 62, and an intra-device controller 81 or 82. First refrigerant flows through the use-side expansion valve 62 and the use-side heat exchanger 61 of each first indoor unit 109. Second refrigerant flows through the use-side expansion valve 62 and the use-side heat exchanger 61 of each second indoor unit 209. The intra-device controllers 81 and 82 each control the use-side expansion valve 62.

The use-side heat exchanger 61 is a device that allows heat exchange to be performed between refrigerant and indoor air. The use-side expansion valve 62 is a device that decompresses refrigerant in a gas state or adjusts the flow rate of refrigerant. One inlet/outlet of the use-side expansion valve 62 is connected to the refrigerant pipe 18 or the refrigerant pipe 28. The other inlet/outlet of the use-side expansion valve 62 is connected to one inlet/outlet of the use-side heat exchanger 61. The other inlet/outlet of the use-side heat exchanger 61 is connected to the refrigerant pipe 19 or the refrigerant pipe 29.

(2-3) Cooling Operation

In a cooling operation, each use-side heat exchanger 61 functions as an evaporator to decrease the temperature of air in the air conditioning target space CS.

The compressor 51 discharges refrigerant in a high-pressure gas state to the heat-source-side heat exchanger 53 via a path connecting the first port and the second port of the four-way valve 52. The heat-source-side heat exchanger 53 causes heat exchange to be performed between the refrigerant in a high-pressure gas state and outdoor air to condense the refrigerant. The intra-device controller 81 of the first outdoor unit 108 or the intra-device controller 82 of the second outdoor unit 208 is fixed, for example, in a state in which the heat-source-side expansion valve 54 is opened. The refrigerant in a high-pressure liquid state obtained through condensation by the heat-source-side heat exchanger 53 is transmitted via the heat-source-side expansion valve 54 and the refrigerant pipe 18 or 28.

Each use-side expansion valve 62 decompresses the refrigerant in a high-pressure liquid state transmitted via the refrigerant pipe 18 or 28. Each use-side heat exchanger 61 causes heat exchange to be performed between refrigerant in a low-pressure liquid state transmitted from the corresponding use-side expansion valve 62 and indoor air to evaporate the refrigerant. The intra-device controller 81 of each first indoor unit 109 or the intra-device controller 82 of each second indoor unit 209 adjusts the opening degree of the corresponding use-side expansion valve 62 so that, for example, the degree of superheating of the refrigerant at the other inlet/outlet of the corresponding use-side heat exchanger 61 becomes a target value of degree of superheating. The refrigerant in a low-pressure gas state obtained through evaporation in each use-side heat exchanger 61 is sucked into the compressor 51 via the refrigerant pipe 19 or 29 and a path connecting the fourth port and the third port of the four-way valve 52.

(2-4) Heating Operation

In a heating operation, each use-side heat exchanger 61 functions as a condenser to increase the temperature of air in the air conditioning target space CS.

The compressor 51 discharges refrigerant in a high-pressure gas state to each use-side heat exchanger 61 via a path connecting the first port and the fourth port of the four-way valve 52 and the refrigerant pipe 19 or 29. Each use-side heat exchanger 61 causes heat exchange to be performed between the refrigerant in a high-pressure gas state and indoor air to condense the refrigerant. Each use-side expansion valve 62 adjusts the flow rate of refrigerant in a high-pressure liquid state obtained through condensation by the corresponding use-side heat exchanger 61. The intra-device controller 81 of each first indoor unit 109 or the intra-device controller 82 of each second indoor unit 209 adjusts the opening degree of the corresponding use-side expansion valve 62 so that, for example, the degree of subcooling of the refrigerant at the other inlet/outlet of the corresponding use-side heat exchanger 61 becomes a target value of degree of subcooling. The refrigerant in a high-pressure liquid state exited from each use-side expansion valve 62 is transmitted to the heat-source-side expansion valve 54 via the refrigerant pipe 18 or 28.

The heat-source-side expansion valve 54 decompresses the refrigerant in a high-pressure liquid state transmitted via the refrigerant pipe 18 or 28. The heat-source-side heat exchanger 53 causes heat exchange to be performed between refrigerant in a low-pressure liquid state transmitted from the heat-source-side expansion valve 54 and outdoor air to evaporate the refrigerant. The refrigerant in a low-pressure gas state obtained through evaporation in the heat-source-side heat exchanger 53 is sucked into the compressor 51 via a path connecting the second port and the third port of the four-way valve 52. The intra-device controller 81 of the first outdoor unit 108 or the intra-device controller 82 of the second outdoor unit 208 adjusts the opening degree of the heat-source-side expansion valve 54 so that, for example, the degree of superheating of the refrigerant sucked into the compressor 51 becomes a target value of degree of superheating.

(3) Communication in Device Network System N1

(3-1) Communication for System Recognition

Communication for system recognition in the device network system N1 according to the third embodiment at the time of performing system recognition can be performed similarly to communication for system recognition in the device network system according to the second embodiment, and thus the description thereof is omitted.

As a result of recognizing the first network 10 including the first outdoor unit 108 and the plurality of first indoor units 109, the first outdoor unit 108 and the plurality of first indoor units 109 belonging to the first refrigerant system can be recognized. With use of the first network 10, the first refrigerant system can be appropriately controlled. Similarly, as a result of recognizing the second network 20 including the second outdoor unit 208 and the plurality of second indoor units 209, the second outdoor unit 208 and the plurality of second indoor units 209 belonging to the second refrigerant system can be recognized. With use of the second network 20, the second refrigerant system can be appropriately controlled.

(3-2) Communication after System Recognition

After system recognition has been completed, the communication addresses of all the first indoor units 109 connected to the first transmission line 115 are registered in an identical system list in the MCU 81$a$ of the first outdoor unit 108. After system recognition has been completed, the communication addresses of all the second indoor units 209 connected to the second transmission line 215 are registered in an identical system list in the MCU 82$a$ of the second outdoor unit 208.

The first outdoor unit 108 is capable of specifying the plurality of first indoor units 109 belonging to the first refrigerant system by using the identical system list stored in the MCU 81$a$, and controlling the vapor compression refrigeration cycle of the first refrigerant system through the first transmission line 115. The second outdoor unit 208 is capable of specifying the plurality of second indoor units 209 belonging to the second refrigerant system by using the identical system list stored in the MCU 82$a$, and controlling the vapor compression refrigeration cycle of the second refrigerant system.

For example, when the discharge temperature of the compressor 51 of the first outdoor unit 108 becomes abnormally high, the first outdoor unit 108 is capable of instructing, through the first transmission line 115 by using the transceiver 81$d$, all the first indoor units 109 registered in the identical system list to cope with the abnormal discharge temperature of the compressor 51. The first outdoor unit 108 is also capable of requesting, through the first transmission line 115 by using the transceiver 81$d$, some of the first indoor units 109 registered in the identical system list to change, for example, the opening degree of the use-side expansion valve 62, the target value of degree of superheating, the target value of degree of subcooling, or the like. The first outdoor unit 108 is also capable of requesting, through the first transmission line 115 by using the transceiver 81$d$, some of the first indoor units 109 registered in the identical system list to transmit information held by the individual first indoor units 109 to the first outdoor unit 108.

The first outdoor unit 108 and the second outdoor unit 208 are capable of communicating, through the first transmission line 115 and the second transmission line 215 by using the transceivers 81$d$ and 82$d$, with all the first indoor units 109 and all the second indoor units 209. For example, when the first outdoor unit 108 is capable of communicating with a management apparatus outside the building BD via a public line, the first outdoor unit 108 is capable of collecting information on all the first indoor units 109 and all the second indoor units 209 through the first transmission line 115 and the second transmission line 215 by using the transceiver 81$d$, and transmitting the information to the management apparatus.

(4) Features of Third Embodiment (4-1)

In the device network system N1 according to the third embodiment, the first filter HPFa prevents a first recognition signal for recognizing the first outdoor unit 108 and the plurality of first indoor units 109 which are first devices as devices of an identical group from being transmitted to the second network 20. As a result of the first recognition signal being blocked by the first filter HPFa, the first recognition signal enables the first outdoor unit 108 and the plurality of first indoor units 109 of the first network 10 to be recognized while being distinguished from the second outdoor unit 208 and the plurality of second indoor units 209 which are a plurality of second devices of the second network 20. Between the first network 10 and the second network 20, the first outdoor unit 108 and the plurality of first indoor units 109, and the second outdoor unit 208 and the plurality of second indoor units 209, are capable of communicating with each other by using communication signals.

(4-2)

In the device network system N1 according to the third embodiment, the first recognition signal used for system recognition of the first network 10 which is the first system makes it is possible to suppress recognition error in which a plurality of second devices of the second network 20 in which different refrigerant circulates are included in the first system.

(4-3)

In the device network system N1 according to the third embodiment, as a result of the first recognition signal being blocked by the first filter HPFa, the first outdoor unit 108 including the first processing unit 11 is capable of recognizing the plurality of first indoor units 109 while distinguishing them from the second outdoor unit 208 and the plurality of second indoor units 209 by using the first recognition signal. Communication signals enable communication to be performed between the plurality of first indoor units 109 and the first outdoor unit 108, and the plurality of second indoor units 209 and the second outdoor unit 208.

(4-4)

In the device network system N1 according to the third embodiment, as a result of the second recognition signal being blocked by the first filter HPFa, the second recognition signal enables the second outdoor unit 208 and the plurality of second indoor units 209 of the second network 20 to be recognized while being distinguished from the first outdoor unit 108 and the plurality of first indoor units 109 which are a plurality of first devices of the first network 10.

(4-5)

Figure 13:
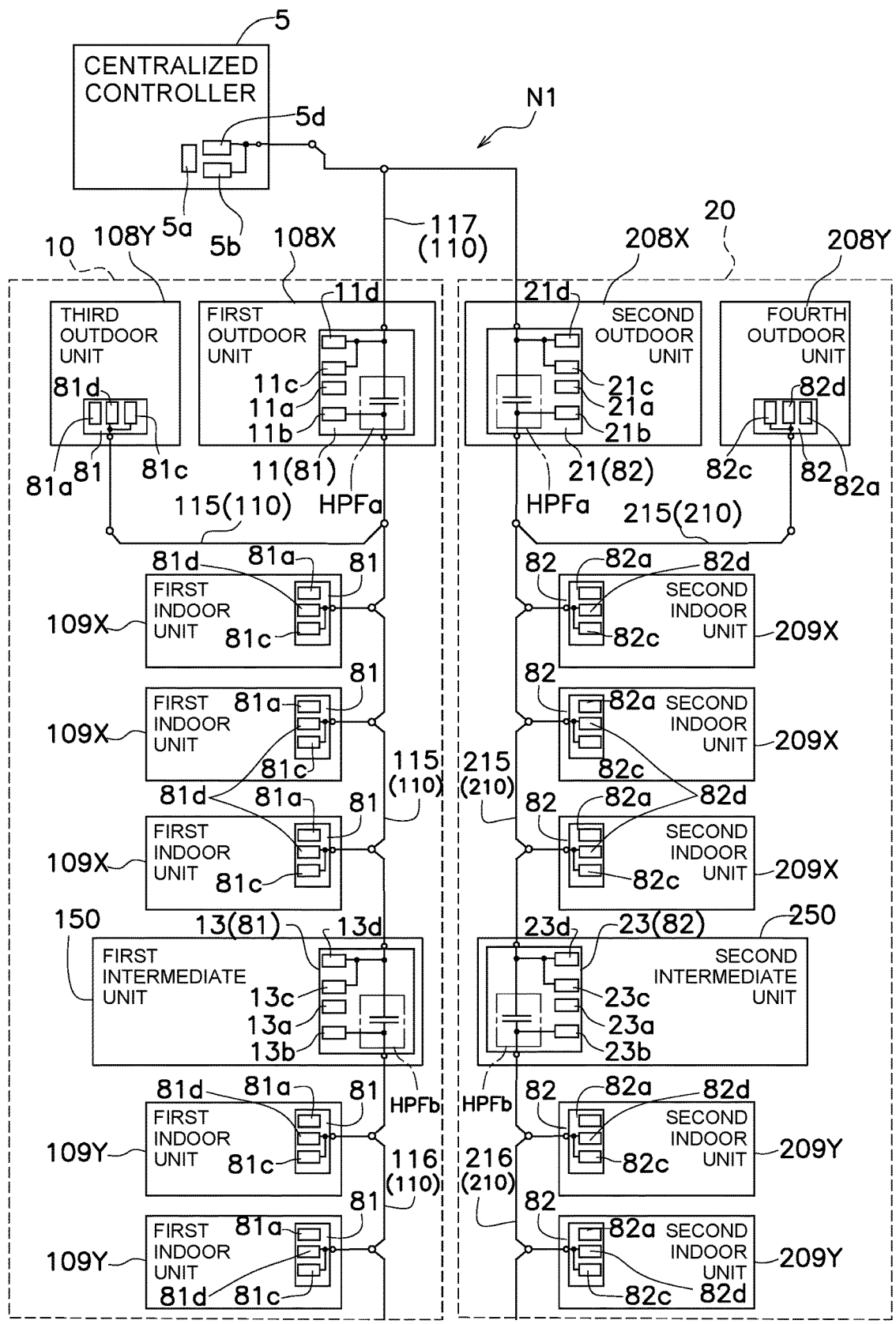
FIG. 13 is a circuit diagram illustrating an overview of one configuration example of a device network system according to a fourth embodiment.

The above-described device network system N1 can be configured by using the first filter HPFa including a capacitor or a relay. The capacitor or the relay makes it easy to implement the device network system N1.

Fourth Embodiment (1) Overall Configuration A description has been given that, in the device network system N1 according to the second embodiment and the third embodiment, the first network 10 and the second network 20 are connected via one first filter HPFa. However, the first network 10 and the second network 20 may be connected via a plurality of filters HPF, as in the device network system N1 according to a fourth embodiment illustrated in FIG. 13.

In the device network system N1 according to the second embodiment and the third embodiment, the first network 10 including the plurality of first devices 107 or the first network 10 including the first outdoor unit 108 and the plurality of first indoor units 109 is configured by using the physical first transmission line 115. A filter that blocks a signal is not provided midway in the physical first transmission line 115. Similarly, a filter that blocks a signal is not provided midway in the physical second transmission line 215 for constituting the second network 20. However, as in the device network system N1 according to the fourth embodiment illustrated in FIG. 13, a physical first transmission line 115 and third transmission line 116 for constituting the first network 10 can be provided, and these two first transmission line 115 and third transmission line 116 can be connected via a second filter HPFb. Similarly, a physical second transmission line 215 and fourth transmission line 216 for constituting the second network 20 can be provided, and these two second transmission line 215 and fourth transmission line 216 can be connected via a second filter HPFb. The configuration of the second filter HPFb may be, for example, similar to the configuration of the first filter HPFa. The second filter HPFb is a device that passes a communication signal which is a high-frequency signal and that blocks a first recognition signal, a second recognition signal, a third recognition signal, and a fourth recognition signal which are low-frequency signals.

The device network system N1 according to the fourth embodiment includes a centralized controller 5, a first outdoor unit 108X, a second outdoor unit 208X, a third outdoor unit 108Y, a fourth outdoor unit 208Y, first indoor units 109X of an upper group, a first intermediate unit 150, first indoor units 109Y of a lower group, second indoor units 209X of an upper group, a second intermediate unit 250, and second indoor units 209Y of a lower group.

The first network 10 includes the first outdoor unit 108X, the third outdoor unit 108Y, the first indoor units 109X and 109Y, and the first intermediate unit 150. The second network 20 includes the second outdoor unit 208X, the fourth outdoor unit 208Y, the second indoor units 209X and 209Y, and the second intermediate unit 250.

(1-1) Circulation of First Refrigerant and Second Refrigerant

Also in the fourth embodiment, first refrigerant flows through the devices belonging to the first network 10, and second refrigerant flows through the devices belonging to the second network 20.

The first refrigerant exited from the first outdoor unit 108X and the third outdoor unit 108Y enters the plurality of first indoor units 109X of the upper group and exchanges heat with indoor air in each first indoor unit 109X. The first refrigerant that has exchanged heat in each first indoor unit 109X returns to the first outdoor unit 108X and the third outdoor unit 108Y and exchanges heat with outdoor air in the first outdoor unit 108X and the third outdoor unit 108Y. The first refrigerant exited from the first outdoor unit 108X and the third outdoor unit 108Y enters the plurality of first indoor units 109Y of the lower group via the first intermediate unit 150 and exchanges heat with indoor air in each first indoor unit 109Y. The first intermediate unit 150 is a device that adjusts the first refrigerant that is to flow through the plurality of first indoor units 109Y connected to the first intermediate unit 150, for example, switches the flow of the first refrigerant that is to flow through the plurality of first indoor units 109Y.

The second refrigerant exited from the second outdoor unit 208X and the fourth outdoor unit 208Y enters the plurality of second indoor units 209X of the upper group and exchanges heat with indoor air in each second indoor unit 209X. The second refrigerant that has exchanged heat in each second indoor unit 209X returns to the second outdoor unit 208X and the fourth outdoor unit 208Y and exchanges heat with outdoor air in the second outdoor unit 208X and the fourth outdoor unit 208Y. The second refrigerant exited from the second outdoor unit 208X and the fourth outdoor unit 208Y enters the plurality of second indoor units 209Y of the lower group via the second intermediate unit 250 and exchanges heat with indoor air in each second indoor unit 209Y. The second intermediate unit 250 is a device that adjusts the second refrigerant that is to flow through the plurality of second indoor units 209Y connected to the second intermediate unit 250, for example, switches the flow of the second refrigerant that is to flow through the plurality of second indoor units 209Y.

(1-2) Overview of System Recognition in Device Network System N1

System recognition in the device network system N1 according to the fourth embodiment is performed by the first processing unit 11 of the first outdoor unit 108X, the second processing unit 21 of the second outdoor unit 208X, a third processing unit 13 of the first intermediate unit 150, a fourth processing unit 23 of the second intermediate unit 250, and the centralized controller 5.

The centralized controller 5 includes an MCU 5a, a transmitter 5b that transmits a fifth recognition signal having a low frequency, and a transceiver 5d that transmits and receives a communication signal having a high frequency.

In the device network system N1 according to the fourth embodiment, the first outdoor unit 108X according to the fourth embodiment includes an intra-device controller 81 functioning as the first processing unit 11, like the first outdoor unit 108 according to the third embodiment. The second outdoor unit 208X according to the fourth embodiment includes an intra-device controller 82 functioning as the second processing unit 21, like the second outdoor unit 208 according to the third embodiment.

The first processing unit 11 of the first outdoor unit 108X according to the fourth embodiment is different from the first processing unit 11 according to the third embodiment in including a receiver 11c for communicating with the centralized controller 5. The second processing unit 21 of the second outdoor unit 208X according to the fourth embodiment is different from the second processing unit 21 according to the third embodiment in including a receiver 21c for communicating with the centralized controller 5. The receivers 11c and 21c are capable of receiving a fifth recognition signal having a low frequency and transmitted by the transmitter 5b of the centralized controller 5. The MCU 11a, the transmitter 11b, and the transceiver 11d of the first processing unit 11 according to the fourth embodiment are similar to those of the first processing unit 11 according to the third embodiment, and thus the description thereof is omitted. Also, the MCU 21*a*, the transmitter 21*b*, and the transceiver 21*d* of the second processing unit 21 according to the fourth embodiment are similar to those of the second processing unit 21 according to the third embodiment, and thus the description thereof is omitted.

The first indoor units 109X according to the fourth embodiment each include an intra-device controller 81, like the first indoor units 109 according to the third embodiment. The second indoor units 209X according to the fourth embodiment each include an intra-device controller 82, like the second indoor units 209 according to the third embodiment.

The third outdoor unit 108Y includes an intra-device controller 81. The intra-device controller 81 included in each first indoor unit 109X and the intra-device controller 81 included in the third outdoor unit 108Y are different from each other in that the former controls the internal mechanism inside the indoor unit whereas the latter controls the internal mechanism inside the outdoor unit. However, the intra-device controllers 81 included in the first indoor unit 109X and the third outdoor unit 108Y have the same function in terms of communication, and are thus described herein as similar controllers in terms of communication while being denoted by the same reference signs. The fourth outdoor unit 208Y includes an intra-device controller 82. The intra-device controller 82 included in each second indoor unit 209X and the intra-device controller 82 included in the fourth outdoor unit 208Y are different from each other in that the former controls the internal mechanism inside the indoor unit whereas the latter controls the internal mechanism inside the outdoor unit. However, the intra-device controllers 82 included in the second indoor unit 209X and the fourth outdoor unit 208Y have the same function in terms of communication, and are thus described as similar controllers in terms of communication while being denoted by the same reference signs.

The third processing unit 13 included in the first intermediate unit 150 includes an MCU 13*a*, a transmitter 13*b* that transmits a third recognition signal having a low frequency, a receiver 13*c* that receives a first recognition signal having a low frequency, and a transceiver 13*d* that transmits and receives a communication signal having a high frequency. The fourth processing unit 23 included in the second intermediate unit 250 includes an MCU 23*a*, a transmitter 23*b* that transmits a fourth recognition signal having a low frequency, a receiver 23*c* that receives a second recognition signal having a low frequency, and a transceiver 23*d* that transmits and receives a communication signal having a high frequency.

Each first filter HPFa has a function of blocking a first recognition signal having a low frequency, a second recognition signal having a low frequency, and a fifth recognition signal having a low frequency. Each second filter HPFb has a function of blocking a first recognition signal having a low frequency, a second recognition signal having a low frequency, a third recognition signal having a low frequency, and a fourth recognition signal having a low frequency. Each first filter HPFa and each second filter HPFb pass a communication signal having a high frequency without substantially attenuating the communication signal. The first recognition signal, the second recognition signal, the third recognition signal, the fourth recognition signal, and the fifth recognition signal may be low-frequency signals having the same frequency or may be low-frequency signals having different frequencies.

Figure 11:
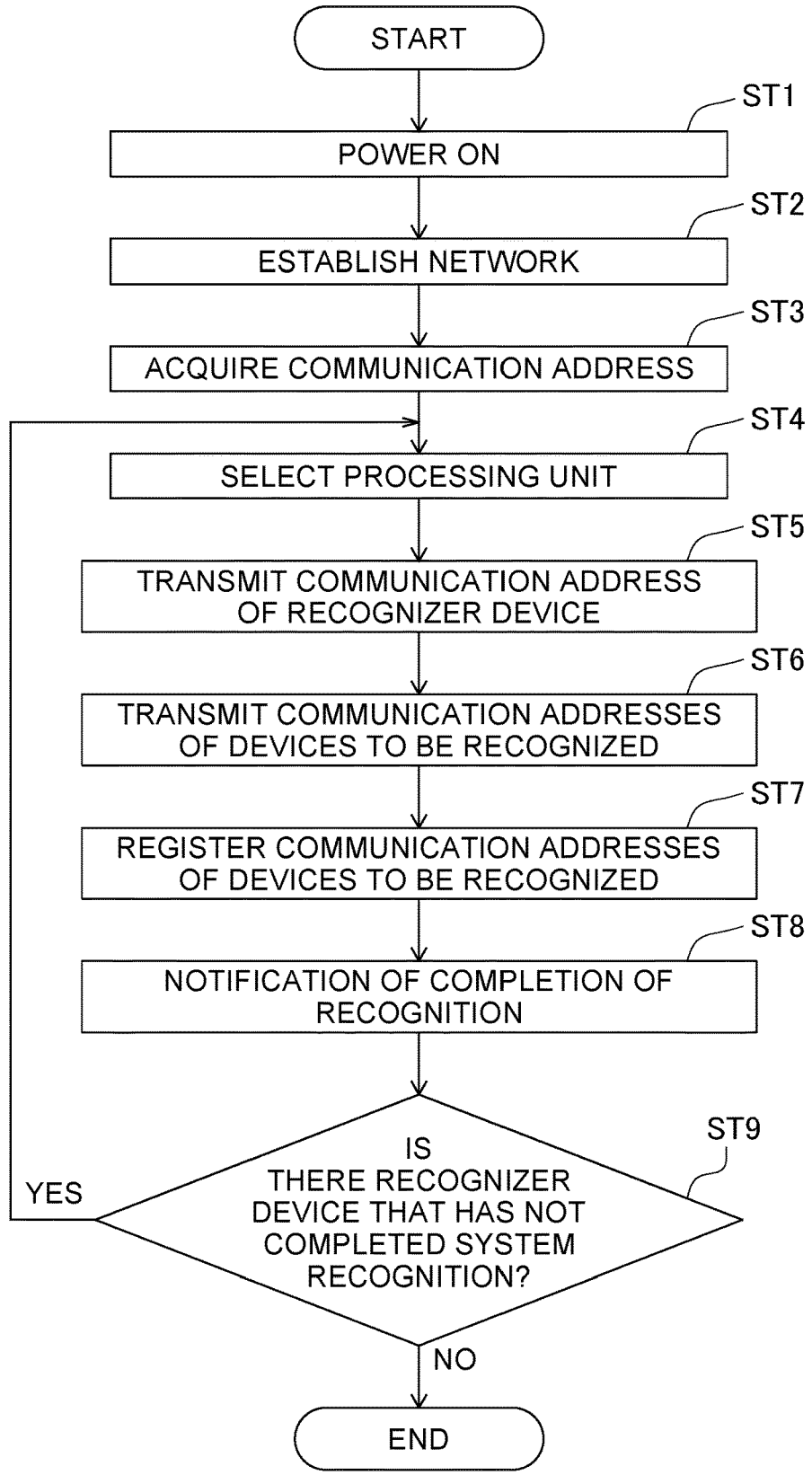
FIG. 11 is a flowchart for describing communication for system recognition in the device network system.

Also in communication for system recognition according to the fourth embodiment, the power of the device network system N1 is turned on first in step ST1 illustrated in FIG. 11.

Subsequently, the centralized controller 5, the first processing unit 11, the second processing unit 21, the third processing unit 13, the fourth processing unit 23, and the intra-device controllers 81 and 82 that are connected to any of the first transmission line 115, the second transmission line 215, the third transmission line 116, the fourth transmission line 216, and a fifth transmission line 117 establish a network (step ST2).

After establishing the communication network, the centralized controller 5, the first processing unit 11, the second processing unit 21, the third processing unit 13, the fourth processing unit 23, and the intra-device controllers 81 and 82 each acquire a communication address (step ST3).

The first processing unit 11 and the second processing unit 21 cooperate with each other by communication using the transceivers 11*d* and 21*d* to select an uncompleted processing unit or centralized controller 5 (step ST4). After the selection in step ST4 and the operations to step ST9, if there is an uncompleted processing unit or centralized controller 5, the process returns to step ST4 and the operations to step ST9 are repeated. Here, a description will be given of, for example, a case where the centralized controller 5 is first selected and then the first processing unit 11, the second processing unit 21, the third processing unit 13, and the fourth processing unit 23 are selected in this order.

(1-3) System Recognition by Centralized Controller 5

The centralized controller 5 recognizes, using a fifth recognition signal having a low frequency, that the first outdoor unit 108X and the second outdoor unit 208X are connected to the fifth transmission line 117. As a result of recognizing the first outdoor unit 108X and the second outdoor unit 208X, the centralized controller 5 is capable of recognizing that there are a first network to which the first outdoor unit 108X belongs and a second network to which the second outdoor unit 208X belongs.

The selected centralized controller 5 transmits a fifth recognition signal through the fifth transmission line 117 by using the transmitter 5*b* (step ST5). The fifth recognition signal transmitted by the transmitter 5*b* is a low-frequency signal, and is thus blocked by the first filter HPFa. Thus, due to the first filter HPFa, the devices other than the first outdoor unit 108X and the second outdoor unit 208X are incapable of receiving the fifth recognition signal transmitted by the transmitter 5*b* of the centralized controller 5. The centralized controller 5 transmits its communication address in the form of a communication signal by using the transceiver 5*d* at the same time of or before or after transmitting the fifth recognition signal. In this case, the centralized controller 5 may be configured to transmit the communication address in the form of a low-frequency signal having a frequency that is not 0. The first outdoor unit 108X that has received the fifth recognition signal by using the receiver 11*c* and received the communication address of the centralized controller 5 by using the transceiver 11*d* or the receiver 11*c* through the fifth transmission line 117 stores the received communication address in the memory of the MCU 11*a*. The second outdoor unit 208X that has received the fifth recognition signal by using the receiver 21*c* and received the communication address of the centralized controller 5 by using the transceiver 21*d* or the receiver 21*c* through the fifth transmission line 117 stores the received communication address in the memory of the MCU 21*a*.

The first processing unit 11 and the second processing unit 21 that have received the fifth recognition signal and the communication address of the centralized controller 5 transmit their communication addresses to the communication address of the centralized controller 5 (step ST6). Subsequently, the centralized controller 5 registers the received communication addresses of the first processing unit 11 and the second processing unit 21 in an identical system list in which the devices of different networks are to be registered (step ST7).

After a predetermined time elapses from the last reception of a communication address, for example, the centralized controller 5 determines that all the devices connected to the fifth transmission line 117 have been registered and notifies the entire device network system N1 that system recognition by the centralized controller 5 has been completed (step ST8).

(1-4) System Recognition by First Outdoor Unit 108X and Second Outdoor Unit 208X The configuration of the device network system N1 according to the fourth embodiment in which the first processing unit 11 of the first outdoor unit 108X and the intra-device controllers 81 of the first indoor units 109X are connected by the first transmission line 115 is the same as the configuration of the device network system N1 according to the third embodiment. Thus, system recognition of the plurality of first indoor units 109X by the first outdoor unit 108X according to the fourth embodiment can be performed similarly to the system recognition described in the third embodiment. However, the intra-device controller 81 of the third outdoor unit 108Y and the third processing unit 13 of the first intermediate unit 150 are connected to the first transmission line 115. The third outdoor unit 108Y and the first intermediate unit 150 are also recognized, by the first outdoor unit 108X, as belonging to the first network 10 together with the first indoor units 109X by using the first recognition signal transmitted from the first outdoor unit 108X through the first transmission line 115. The first intermediate unit 150 is capable of knowing that the first intermediate unit 150 is a device to be recognized, for example, at the time of cooperation in step ST4. Accordingly, the first intermediate unit 150 is capable of reliably receiving a first recognition signal by using the receiver 13c connected to the first transmission line 115.

The first outdoor unit 108X that has recognized that the third outdoor unit 108Y, the three first indoor units 109X, and the first intermediate unit 150 belong to the first network 10 transmits information indicating the fact to the centralized controller 5 through the fifth transmission line 117 by using a communication signal. The centralized controller 5 registers the communication addresses of the third outdoor unit 108Y, the three first indoor units 109X, and the first intermediate unit 150 in the identical system list in which the first outdoor unit 108X is registered.

The configuration of the device network system N1 according to the fourth embodiment in which the second processing unit 21 of the second outdoor unit 208X and the intra-device controllers 82 of the second indoor units 209X are connected by the second transmission line 215 is the same as the configuration of the device network system N1 according to the third embodiment. Thus, system recognition of the plurality of second indoor units 209X by the second outdoor unit 208X according to the fourth embodiment can be performed similarly to the system recognition described in the third embodiment. However, the intra-device controller 82 of the fourth outdoor unit 208Y and the fourth processing unit 23 of the second intermediate unit 250 are connected to the second transmission line 215. The fourth outdoor unit 208Y and the second intermediate unit 250 are also recognized, by the second outdoor unit 208X, as belonging to the second network 20 together with the second indoor units 209X by using the second recognition signal transmitted from the second outdoor unit 208X through the second transmission line 215. The second intermediate unit 250 is capable of knowing that the second intermediate unit 250 is a device to be recognized, for example, at the time of cooperation in step ST4. Accordingly, the second intermediate unit 250 is capable of reliably receiving a second recognition signal by using the receiver 23c connected to the second transmission line 215.

The second outdoor unit 208X that has recognized that the fourth outdoor unit 208Y, the three second indoor units 209X, and the second intermediate unit 250 belong to the second network 20 transmits information indicating the fact to the centralized controller 5 through the fifth transmission line 117 by using a communication signal. The centralized controller 5 registers the communication addresses of the fourth outdoor unit 208Y, the three second indoor units 209X, and the second intermediate unit 250 in the identical system list in which the second outdoor unit 208X is registered.

(1-5) System Recognition by First Intermediate Unit 150 and Second Intermediate Unit 250

Upon the first intermediate unit 150 being selected, the first intermediate unit 150 transmits a third recognition signal to the plurality of first indoor units 109Y of the lower group connected to the first intermediate unit 150 through the third transmission line 116 by using the transmitter 13b (step ST5). The third recognition signal transmitted by the transmitter 13b is a low-frequency signal, and is thus blocked by the second filter HPFb. Due to the attenuation function of the second filter HPFb, the devices other than the first indoor units 109Y of the lower group, such as the third outdoor unit 108Y and the plurality of first indoor units 109X, are not capable of receiving the third recognition signal transmitted by the transmitter 13b of the first intermediate unit 150. The first intermediate unit 150 transmits its communication address in the form of a communication signal by using the transceiver 13d at the same time of or before or after transmitting the third recognition signal. In this case, the first intermediate unit 150 may be configured to transmit the communication address in the form of a low-frequency signal having a frequency that is not 0. The plurality of first indoor units 109Y that have received the third recognition signal by using the receivers 81c and received the communication address of the first intermediate unit 150 by using the transceivers 81d or the receivers 81c through the third transmission line 116 store the received communication address in the memories of the respective MCUs 81a.

The plurality of first indoor units 109Y that have received the third recognition signal and the communication address of the first intermediate unit 150 transmit their communication addresses to the communication address of the first intermediate unit 150 (step ST6). The first intermediate unit 150 registers the communication addresses of the plurality of first indoor units 109Y transmitted through the third transmission line 116 in an identical system list in which the devices of the lower group of the first network 10 are to be registered (step ST7).

After completing registration of all the first indoor units 109Y of the lower group, the first intermediate unit 150 notifies the entire network that system recognition by the first intermediate unit 150 has been completed (step ST8). At this time, the first intermediate unit 150 transmits the communication addresses of the first indoor units 109Y of the lower group to the MCU 11*a* of the first outdoor unit 108X through the first transmission line 115 by using the transceiver 13*d*. The first outdoor unit 108X registers the communication addresses of the plurality of first indoor units 109Y received from the first intermediate unit 150 in the identical system list as the communication addresses of the devices of the lower group of the first network 10. The first outdoor unit 108X transmits the communication addresses of the first indoor units 109Y of the lower group to the MCU 5*a* of the centralized controller 5 through the fifth transmission line 117 by using the transceiver 11*d*. The centralized controller 5 registers the communication addresses of the plurality of first indoor units 109Y received from the first outdoor unit 108X in the identical system list of the first network 10 in which the first indoor units 109X of the upper group are registered, as the communication addresses of the devices of the lower group of the first network 10.

Recognition of the plurality of second indoor units 209Y of the lower group when the second intermediate unit 250 is selected can be performed by an operation similar to that of recognition of the plurality of first indoor units 109Y of the lower group when the above-described first intermediate unit 150 is selected. Thus, a description of an operation of recognizing the plurality of second indoor units 209Y of the lower group when the second intermediate unit 250 is selected is omitted.

(2) Features of Fourth Embodiment (2-1)

In the device network system N1 according to the fourth embodiment, the first filter HPFa prevents a first recognition signal for recognizing the first outdoor unit 108X, the third outdoor unit 108Y, the plurality of first indoor units 109X, the first intermediate unit 150, and the plurality of first indoor units 109Y which are first devices as devices of an identical group from being transmitted to the second network 20. As a result of the first recognition signal being blocked by the first filter HPFa, the first recognition signal enables the first outdoor unit 108X, the third outdoor unit 108Y, the plurality of first indoor units 109X, the first intermediate unit 150, and the plurality of first indoor units 109Y which are first devices of the first network 10 to be recognized while being distinguished from the second outdoor unit 208X, the fourth outdoor unit 208Y, the plurality of second indoor units 209X, the second intermediate unit 250, and the plurality of second indoor units 209Y which are a plurality of second devices of the second network 20. Between the first network 10 and the second network 20, a communication signal makes it possible to perform communication between the first outdoor unit 108X, the third outdoor unit 108Y, the plurality of first indoor units 109X, the first intermediate unit 150, and the plurality of first indoor units 109Y which are first devices, and the second outdoor unit 208X, the fourth outdoor unit 208Y, the plurality of second indoor units 209X, the second intermediate unit 250, and the plurality of second indoor units 209Y which are second devices.

(2-2)

In the device network system N1 according to the fourth embodiment, the second filter HPFb prevents a first recognition signal for recognizing the first outdoor unit 108X, the third outdoor unit 108Y, the plurality of first indoor units 109X, and the first intermediate unit 150 of the upper group from being transmitted to the plurality of first indoor units 109Y of the lower group. As a result of the first recognition signal being blocked by the second filter HPFb, the first outdoor unit 108X, the third outdoor unit 108Y, the plurality of first indoor units 109X, and the first intermediate unit 150 of the upper group can be determined while being distinguished from the plurality of first indoor units 109Y of the lower group. Between the upper group and the lower group, a communication signal makes it possible to perform communication between the first outdoor unit 108X, the third outdoor unit 108Y, the plurality of first indoor units 109X, and the first intermediate unit 150, and the plurality of first indoor units 109Y.

(2-3)

In the device network system N1 according to the fourth embodiment, the first recognition signal used for system recognition of the first network 10 which is the first system makes it is possible to suppress recognition error in which a plurality of second devices of the second network 20 in which different refrigerant circulates are included in the first system.

(2-4)

In the device network system N1 according to the fourth embodiment, as a result of the second recognition signal being blocked by the first filter HPFa, the second recognition signal enables the second outdoor unit 208X, the fourth outdoor unit 208Y, the plurality of second indoor units 209X, the second intermediate unit 250, and the plurality of second indoor units 209Y which are second devices of the second network 20 to be recognized while being distinguished from the first outdoor unit 108X, the third outdoor unit 108Y, the plurality of first indoor units 109X, the first intermediate unit 150, and the plurality of first indoor units 109Y which are a plurality of first devices of the first network 10.

(2-5)

In the device network system N1 according to the fourth embodiment, as a result of the first recognition signal being blocked by the first filter HPFa, the first outdoor unit 108X including the first processing unit 11 is capable of recognizing the plurality of first indoor units 109X and 109Y, the third outdoor unit 108Y, and the first intermediate unit 150 while distinguishing them from the plurality of second indoor units 209X and 209Y, the second outdoor unit 208X, the fourth outdoor unit 208Y, and the second intermediate unit 250 by using the first recognition signal. A communication signal makes it possible to perform communication between the plurality of first indoor units 109X and 109Y, the first outdoor unit 108X, the third outdoor unit 108Y, the first intermediate unit 150, the plurality of second indoor units 209X and 209Y, the second outdoor unit 208X, the fourth outdoor unit 208Y, and the second intermediate unit 250.

(2-6)

The above-described device network system N1 can be configured by using the first filter HPFa including a capacitor or a relay. The capacitor or the relay makes it easy to implement the device network system N1.

Modification Examples (1) Modification Examples 1A, 2A, and 3A

In the above-described third embodiment and fourth embodiment, an air conditioning system has been described as an example of the device network system N1. However, the device network system N1 is not limited to an air conditioning system. The device network system N1 to which the technique of the present disclosure is applicable includes, for example, a hot water supply system and a ventilation system.

(2) Modification Examples 1B, 2B, and 3B

Figure 14:
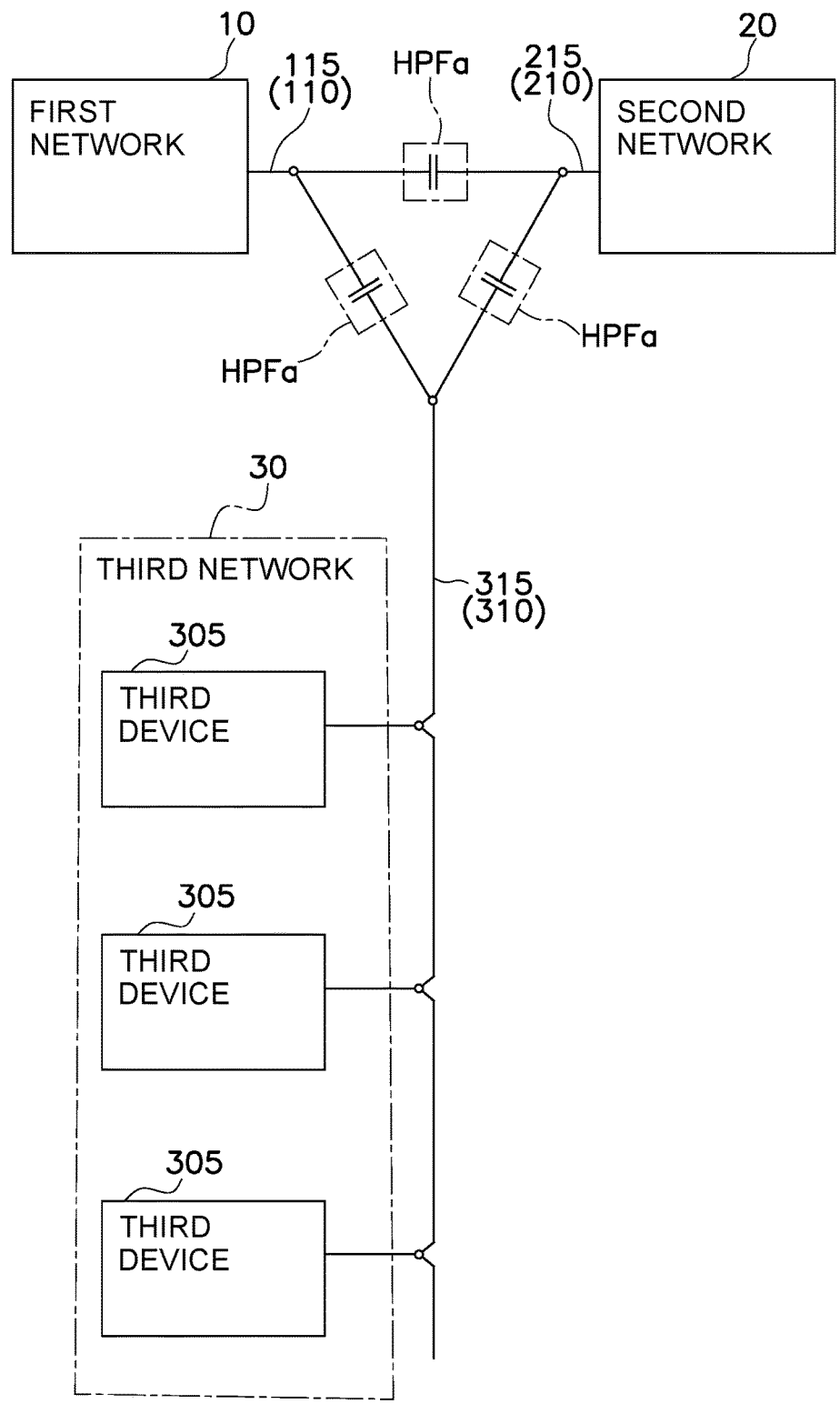
FIG. 14 is a conceptual diagram illustrating an overview of one configuration example of a device network system according to a modification example.

In the above-described second embodiment, third embodiment, and fourth embodiment, a description has been given of a case where the device network system N1 includes the first network 10 and the second network 20. However, the device network system N1 is not limited to a system including only two networks, the first network 10 and the second network 20. For example, the device network system N1 may include a third network 30 including a plurality of third devices 305 as illustrated in FIG. 14. As illustrated in FIG. 14, a physical third transmission line 315 that connects the plurality of third devices 305 is connected to the first transmission line 115 via a first filter HPFa. The third transmission line 315 is also connected to the second transmission line 215 via a first filter HPFa. Thus, a recognition signal which has a low frequency and which is for performing system recognition of the third network 30 is not transmitted through the first transmission line 115 or the second transmission line 215. A communication signal having a high frequency passes through the first filters HPFa, and thus the first transmission line 115, the second transmission line 215, and the third transmission line 315 are capable of transmitting a communication signal.

(3) Modification Example 3C

Figure 15:
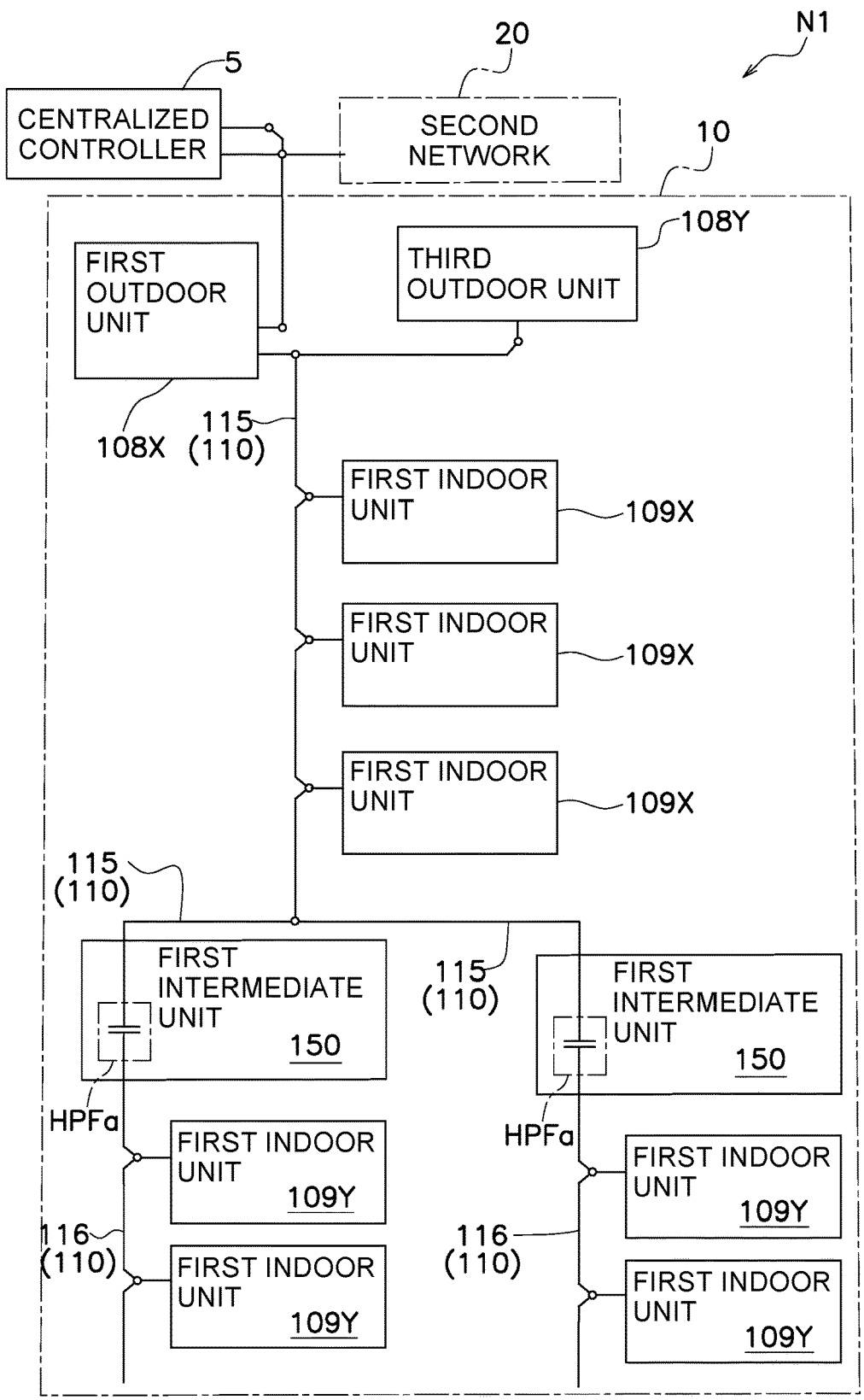
FIG. 15 is a conceptual diagram illustrating an overview of another configuration example of a device network system according to a modification example.

Regarding the device network system N1 according to the above-described fourth embodiment, a description has been given of a case where the first intermediate unit 150 and the plurality of first indoor units 109Y of the lower group are arranged only in one column. However, the first intermediate unit 150 and the plurality of first indoor units 109Y of the device network system N1 are not limited to those arranged only in one column. For example, as illustrated in FIG. 15, first intermediate units 150 and a plurality of first indoor units 109Y of a lower group may be arranged in two columns. Alternatively, the lower group provided in the device network system N1 may be arranged in a plurality of columns of three or more columns. In other words, the device network system N1 may include a plurality of intermediate devices connected in parallel and a plurality of columns of lower groups.

(4) Modification Example 3D

In the above-described fourth embodiment, a description has been given of a case where an intermediate device is the first intermediate unit 150 or the second intermediate unit 250. However, the intermediate device is not limited thereto. For example, a power supply unit that supplies a direct-current voltage or an alternating-current voltage to an indoor unit can be used as a first intermediate device.

The embodiments of the present disclosure have been described above. It is to be understood that the embodiments and the details can be variously changed without deviating from the gist and scope of the present disclosure described in the claims.

REFERENCE SIGNS LIST 10 first network
11 MCU (first processing unit)
100 first device group
101, 102, 103 outdoor unit (first device)
104, 105, 106 indoor unit (first device)
107 first device
108, 108X first outdoor unit (first device)
108Y third outdoor unit (first device)
109, 109X, 109Y first indoor unit (first device)
110 first line group
20 second network
21 MCU (second processing unit)
200 second device group
201, 202 outdoor unit (second device)
203, 204, 205 indoor unit (second device)
207 second device
208, 208X second outdoor unit (second device)
208Y fourth outdoor unit (second device)
209, 209X, 209Y second indoor unit (second device)
210 second line group
150 first intermediate unit (first device, intermediate device)
250 second intermediate unit (second device)
HPF filter
HPFa first filter
HPFb second filter
N1 device network system

CITATION LIST

Patent Literature

PTL 1: Japanese Unexamined Patent Application Publication No. 2016-219983

The invention claimed is:

1. A device network system comprising:
a first network including a first device group and a first line group, the first device group including a plurality of first devices, the first line group being connected to the plurality of first devices;
a second network including a second device group and a second line group, the second device group including a plurality of second devices, the second line group being connected to the plurality of second devices; and
a first processor that performs a recognition process on the first device group of the first network,
wherein in the first network, communication between the first devices is performed by using a high frequency, and the recognition process performed by the first processor uses a recognition signal having a low frequency.

2. The device network system according to claim 1, wherein the first processor transmits a first recognition signal which has a low frequency and which is for recognizing the plurality of first devices as devices of an identical group.

3. The device network system according to claim 2, further comprising
a first filter that is disposed between the first network and the second network, that passes a communication signal which has a high frequency and which is for communication between the first devices and the second devices, and that blocks the first recognition signal.

4. The device network system according to claim 3,
wherein the plurality of first devices include an intermediate device,
wherein the plurality of first devices are grouped into an upper group including the intermediate device and a lower group including the intermediate device, and are configured so that a first device of the upper group and a first device of the lower group are capable of communicating with each other via the intermediate device by using the communication signal,
wherein the device network system comprises a second filter that is disposed between the first device of the lower group and the intermediate device, that passes the communication signal having a high frequency, and that blocks the first recognition signal having a low frequency, and wherein the first processor recognizes the first device of the lower group via the intermediate device by using the first recognition signal.

5. The device network system according to claim 4, wherein the first filter includes a capacitor or a relay, the capacitor or the relay passing the communication signal having a high frequency and blocking the first recognition signal having a low frequency.

6. The device network system according to claim 4, wherein the plurality of first devices belong to an identical first system in which identical refrigerant circulates, and wherein the first recognition signal is used in system recognition for recognizing that the plurality of first devices belong to the first system.

7. The device network system according to claim 4, wherein the plurality of first devices include a plurality of first indoor units that air-condition an inside of a room and a first outdoor unit that allows refrigerant to circulate between the first outdoor unit and the plurality of first indoor units, wherein the plurality of second devices include a plurality of second indoor units that air-condition an inside of a room and a second outdoor unit that allows refrigerant to circulate between the second outdoor unit and the plurality of second indoor units, and wherein the first processor is provided in the first outdoor unit.

8. The device network system according to claim 3, wherein the first filter includes a capacitor or a relay, the capacitor or the relay passing the communication signal having a high frequency and blocking the first recognition signal having a low frequency.

9. The device network system according to claim 8, wherein the plurality of first devices belong to an identical first system in which identical refrigerant circulates, and wherein the first recognition signal is used in system recognition for recognizing that the plurality of first devices belong to the first system.

10. The device network system according to claim 3, further comprising a second processor that transmits a second recognition signal which has a low frequency and which is for recognizing the plurality of second devices as devices of an identical group, wherein the first filter blocks the second recognition signal.

11. The device network system according to claim 3, wherein the plurality of first devices belong to an identical first system in which identical refrigerant circulates, and wherein the first recognition signal is used in system recognition for recognizing that the plurality of first devices belong to the first system.

12. The device network system according to claim 3, wherein the plurality of first devices include a plurality of first indoor units that air-condition an inside of a room and a first outdoor unit that allows refrigerant to circulate between the first outdoor unit and the plurality of first indoor units, wherein the plurality of second devices include a plurality of second indoor units that air-condition an inside of a room and a second outdoor unit that allows refrigerant to circulate between the second outdoor unit and the plurality of second indoor units, and wherein the first processor is provided in the first outdoor unit.

13. The device network system according to claim 2, wherein the plurality of first devices belong to an identical first system in which identical refrigerant circulates, and wherein the first recognition signal is used in system recognition for recognizing that the plurality of first devices belong to the first system.

14. The device network system according to claim 2, wherein the plurality of first devices include a plurality of first indoor units that air-condition an inside of a room and a first outdoor unit that allows refrigerant to circulate between the first outdoor unit and the plurality of first indoor units, wherein the plurality of second devices include a plurality of second indoor units that air-condition an inside of a room and a second outdoor unit that allows refrigerant to circulate between the second outdoor unit and the plurality of second indoor units, and wherein the first processor is provided in the first outdoor unit.

15. The device network system according to claim 1, wherein the plurality of first devices include a plurality of first indoor units that air-condition an inside of a room and a first outdoor unit that allows refrigerant to circulate between the first outdoor unit and the plurality of first indoor units, wherein the plurality of second devices include a plurality of second indoor units that air-condition an inside of a room and a second outdoor unit that allows refrigerant to circulate between the second outdoor unit and the plurality of second indoor units, and wherein the first processor is provided in the first outdoor unit.

16. The device network system according to claim 1, further comprising a second processor that performs a recognition process on the second device group of the second network.

17. The device network system according to claim 16, wherein in the second network, communication between the second devices is performed by using a high frequency, and the recognition process performed by the second processor uses a recognition signal having a low frequency.

18. The device network system according to claim 17, wherein the second processor transmits a second recognition signal which has a low frequency and which is for recognizing the plurality of second devices as devices of an identical group.

19. The device network system according to claim 1, wherein the high frequency is a frequency of 100 kHz or more.

20. The device network system according to claim 1, wherein the low frequency is a frequency of 10 KHz or less.

* * * * *